United States Patent
Clark et al.

(10) Patent No.: US 6,763,443 B1
(45) Date of Patent: Jul. 13, 2004

(54) SYSTEM AND METHOD FOR USING A SYNCHRONOUS MEMORY DEVICE WITH AN ASYNCHRONOUS MEMORY CONTROLLER

(75) Inventors: Randall A. Clark, Ajax (CA); William Ronald Gill, Toronto (CA)

(73) Assignee: Celestica International Inc., North York (CA)

(*) Notice: Subject to any disclaimer, the term of this patent is extended or adjusted under 35 U.S.C. 154(b) by 402 days.

(21) Appl. No.: 09/651,273

(22) Filed: Aug. 30, 2000

(51) Int. Cl.[7] .............................................. G06F 12/00
(52) U.S. Cl. ...................... 711/167; 711/104; 365/222; 365/233
(58) Field of Search .............................. 711/5, 104, 105, 711/167; 365/230.01, 233, 233.5, 222

(56) References Cited

U.S. PATENT DOCUMENTS

| | | | |
|---|---|---|---|
| 5,721,860 A | 2/1998 | Stolt et al. .................. 711/105 |
| 5,812,488 A | * 9/1998 | Zagar et al. ................. 365/233 |
| 5,822,768 A | * 10/1998 | Shakkarwar ................ 711/149 |
| 5,901,304 A | 5/1999 | Hwang et al. ................. 716/1 |
| 5,912,860 A | 6/1999 | Schaefer ................... 365/233.5 |
| 5,926,434 A | * 7/1999 | Mori .......................... 365/233 |
| 5,987,574 A | 11/1999 | Paluch ........................ 711/158 |
| 6,047,361 A | * 4/2000 | Ingenio et al. .............. 711/167 |
| 6,075,830 A | * 6/2000 | Piirainen .................... 375/354 |

\* cited by examiner

*Primary Examiner*—Mano Padmanabhan
*Assistant Examiner*—Pierre M. Vital
(74) *Attorney, Agent, or Firm*—Blake, Cassels & Graydon LLP; George E. Fisk

(57) ABSTRACT

For an asynchronous memory control system, a system and method of interfacing the system with a synchronous memory device is provided. A first set of signals indicating an asynchronous memory operation from the control system and a first memory address associated with the asynchronous memory operation from the control system are received. Next, a second set of signals, a second memory address and at least one asynchronous clock pulse are generated, wherein the generated signals allowing processing of a comparable synchronous operation to the asynchronous operation by the synchronous memory device at the second memory address. The second set of signals and initiation, duration and frequency of the asynchronous clock pulse comply with requirements of the synchronous memory device to process the synchronous operation.

19 Claims, 15 Drawing Sheets

EDO to SDRAM PLD State Diagram

EDO to SDRAM PLD State Diagram

SYSTEM AND METHOD FOR USING A SYNCHRONOUS MEMORY DEVICE WITH AN ASYNCHRONOUS MEMORY CONTROLLER

FIELD OF THE INVENTION

The invention relates to an electronic arrangement and method for utilising synchronous RAM modules with an asynchronous memory controller. More particularly, the invention is directed towards a converter and related method to convert asynchronous RAM control signals to synchronous RAM control signals.

BACKGROUND OF INVENTION

Random access memory (RAM) devices provide electronic storage of data in cells. Each cell is referenced by a memory address. To reduce die costs, RAM is typically arranged as a table of cells wherein, typically, each cell contains one bit of binary data, although memory configurations are available wherein multiple bits are associated with each address. Addresses are split into halves, with each half identifying a row and column of the table of cells. Table cells are accessed selectively by activating appropriate rows and columns of the RAM devices. The intersecting cell of the row and column contains the data associated with the full address.

Inputs to RAM include plurality of address lines, a data line (which is also an output line) and a plurality of control lines determining whether data is being written or read at a location indicated by the addresses present at the address lines. Generally the control signals are provided to the RAM by memory control system which may be embodied in a logic circuit, a dedicated memory controller device or a microprocessor.

To specify a read, write or refresh operation, the Row Access Strobe (RAS), the Column Access Strobe (CAS) and the Write Enable (WE) control lines are selectively activated for the RAM. The timing of the assertion and deassertion of the RAS, CAS and WE control lines determine whether a read, write or refresh operation is being specified.

When a RAS control signal is activated, the upper half of the address present on the address lines is decoded and used to activate a corresponding row of table cells in the RAM. To complete a cell access, the CAS control line is activated and the lower half of the full address is used to activate a corresponding column of tables of cells.

Synchronization for read, write or refresh operations for RAM may be done synchronously, based on a clock pulse, and asynchronously, based on elapsed time. Memory devices have been developed to-conform to operating timing parameters for each synchronization method.

In asynchronous operation, a specific amount of time must elapse to ensure that a read or a write operation for the RAM is complete. Several asynchronous timing protocols for RAM have been developed which are known in the art. In particular, Extended Data Out (EDO) asynchronous RAM has been a commercially accepted format. EDO RAM utilizes output buffers of the memory which are not deactivated on the rising edge of the CAS. Essentially, the column precharge time is eliminated when data is latched out. Another asynchronous memory protocol is Fast Page Mode.

Synchronous dynamic RAM (SDRAM) provides valid data is on the RAM after a specific number of clock cycles have elapsed when a read or write command signal is provided to the SDRAM. Several SDRAM design protocols have been developed including DDR DSRAM, Enhanced SDRAM (ESDRAM), PC SDRAM, and DR DRAM (direct RAMBUS DRAM, licensed by RAMBUS Inc.).

Both asynchronous and synchronous RAM protocols also utilize a refresh command to refresh the data stored in selected cells.

As the popularity of SDRAM increases, the use of and availability of EDO RAM in electronic systems decreases. Existing systems utilizing on EDO RAM technologies cannot utilise SDRAM as the asynchronous timing protocols of EDO RAM were not designed to be compatible with SDRAM.

It is desirable to have a system which enables synchronous RAM to be used in systems designed to use EDO RAM or other asynchronous memory device timing protocols.

SUMMARY OF INVENTION

In a first aspect, the invention provides a method of interfacing an asynchronous memory control system with a synchronous memory device. The method involves receiving a first set of signals indicating an asynchronous memory operation and a first memory address associated with the asynchronous memory operation from the control system. Next, a second set of signals, a second memory address and at least one asynchronous clock pulse are generated. The second set of signals activate a comparable synchronous operation to the asynchronous operation for the synchronous memory device. The comparable synchronous operation is executed on the second memory address. The initiation, duration and frequency of the asynchronous clock pulse(s) comply with requirements of the synchronous memory device to process the synchronous operation.

The method may have the asynchronous clock pulse(s) generated after receiving an edge transition of a signal in the first set of signals. Further, the asynchronous clock pulse(s) may be deasserted after a fixed length of time.

The method may be used where the asynchronous memory control system controls EDO RAM or FAST PAGE RAM.

The method may be used where the synchronous memory is selected from a group comprising SDRAM, PC SDRAM, or synchronous RAM.

The method may process a plurality of read operations for the asynchronous operation with the first set of signals comprising asserting an asynchronous row address strobe signal before asserting a plurality of column address strobe signal followed by deasserting the row address strobe signal. The method may then assert a synchronous activate command before asserting a plurality of synchronous read commands, followed by asserting a synchronous precharge command.

The method may process a plurality of write operations for the asynchronous operation with the first set of signals comprising asserting an asynchronous row address strobe signal followed by asserting a plurality of asynchronous column address strobe signals followed by deasserting the row address strobe signal. The method may then generate the second set of signals comprising asserting a synchronous activate signal then asserting a plurality of synchronous write commands, then asserting a synchronous precharge command.

The method may process a refresh operation for the asynchronous operation with the first set of signals comprising an asserted an asynchronous column address strobe signal before an asserted a row address strobe signal. The method may then generate the second set of signals comprising equivalent refresh signals. Row address strobe and column address strobe signals may be asserted at the same time to generate an equivalent refresh signal.

The method may process an asynchronous operation which is one of a read, a write or a refresh. Further, the method may progress through a plurality of states, wherein each state controls one aspect of generating the second set of signals. Further still, each state may entered according to status of the first set of signals and the each state may be exited with assertion of the asynchronous clock pulse.

In a second aspect, the invention provides a signal converter arrangement for interfacing an asynchronous memory control system with a synchronous memory device. The signal converter arrangement comprises a first set of inputs for receiving from the control system a first set of signals indicating an asynchronous memory operation initiated by the control system and a second set of inputs for receiving a first memory address associated with the asynchronous memory operation. The signal converter has a command generator for receiving the first set of signals, generating a second set of signals of comparable synchronous signals from the first set of signals. The second set of signals activate a comparable synchronous memory operation to the asynchronous memory operation. The command generator also provides the second set of signals to the synchronous memory device. There is also an address generator for generating a second memory address from the first memory address for the synchronous memory operation and providing the second signal set to the synchronous memory device. Further, there is a clock pulse generator for generating at least one asynchronous clock pulse for the synchronous memory operation and providing the asynchronous clock pulse(s) to the synchronous memory device. The signal converter arrangement provides that the second memory address and the asynchronous clock pulse(s) are provided to the synchronous memory device to allow processing of the synchronous operation represented by the second set of signals by the synchronous memory device at the second memory address.

The signal converter arrangement may have the clock pulse generator generating the asynchronous clock pulse(s) after receiving an edge transition of a signal in the first set of signals. Further, the clock pulse generator may deassert the asynchronous clock pulse(s) after a fixed length of time.

The signal converter arrangement may be used where the asynchronous memory control system controls EDO RAM or FAST PAGE RAM.

The signal converter arrangement may be used to control one of a group of synchronous memory protocols comprising SDRAM, PC SDRAM, or SRAM.

The signal converter arrangement may convert a read operation for the asynchronous operation with the first set of signals comprising asserting an asynchronous row address strobe signal before asserting an asynchronous column address strobe signal, followed by deasserting the row address strobe signal. The command generator may generate the second set of signals comprising asserting a synchronous activate command before asserting at least one synchronous read command, followed by asserting a precharge command.

The signal converter arrangement may convert at least one write operation for the asynchronous operation with the first set of signals comprising asserting an asynchronous write enable signal and an asynchronous row address strobe signal followed by asserting at least one asynchronous column address strobe signal before deasserting the row address strobe signal. The command generator may generate the second set of signals comprising asserting a synchronous write enable signal with a synchronous activate command followed by at least one synchronous write command followed by a synchronous refresh command.

The signal converter arrangement may convert a refresh operation for the asynchronous operation with the first set of signals comprising an asserted asynchronous column address strobe signal before an asserted a row address strobe signal. The command generator may generate the second set of signals comprising asserting synchronous refresh command.

The signal converter arrangement may convert the asynchronous operation which is one of a read operation, a write operation or a refresh operation. Further, the signal converter arrangement may have the command generator providing signals based on a plurality of states, wherein each state controls one aspect of generating the second set of signals and progression between two of the plurality of states is controlled by the command generator. Further still, each state may be entered according to status of the first set of signals and the each state may be exited with assertion of the at least one asynchronous clock pulse.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE PREFERRED EMBODIMENTS

Figure 1:
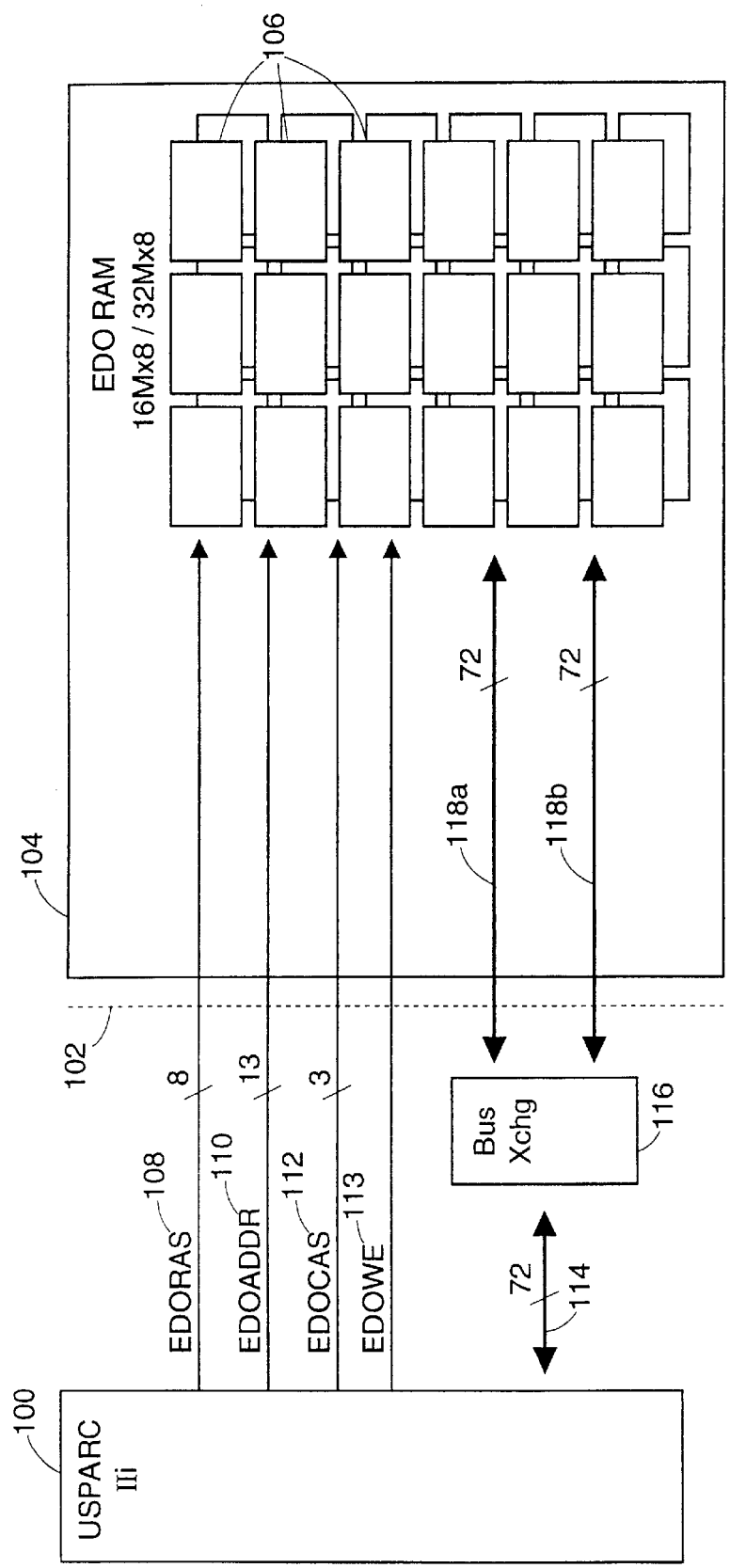
FIG. 1 is a block diagram of prior art of an electronic system interfaced to EDO memory.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Referring to FIG. 1, an electronic system (not shown) has microprocessor 100, which communicates and controls aspects of the electronic system through receiving and processing input signals and generating output signals. In the preferred embodiment, microprocessor 100 is an ULTRASPARC IIi (trademark of Sun Microsystems, Inc., Palo Alto, Calif.) which is available from Sun Microsystems, Inc. A program (not shown) controls the operation of microprocessor 100, including processing of its input and output signals. Through bus 102, microprocessor 100 can access a plurality of EDO memory cards 104.

Memory cards 104 provide microprocessor 100 with banks of addressable EDO RAM 106. One representative system using EDO memory is available from Sun Microsystems, Inc.

As is known in the art, microprocessor 100 accesses EDO RAM 106 by generating compatible asynchronous control signals passed onto bus 102 to EDO RAM cards 104. Control signals include EDO Row Access Strobe (EDO RAS) signal 108, EDO address (EDO ADDR) signals 110, EDO Column Access Strobe (EDO CAS) signal 112 and the EDO Write Enable (EDO WE) signal 113. The program operating in microprocessor 100 causes microprocessor 100 to selectively activate its output lines to generate appropriate control signals which are provided to activate appropriate read, write and refresh operations for EDO RAM 106. Accordingly, microprocessor 100 provides asynchronous control of asynchronous memory.

In the memory configuration memory utilised in FIG. 1, there are 144 bits of data at each address location. Other memory configurations are possible, as is described later. For the preferred embodiment, microprocessor 100 provides data in two halves to memory cards 104. Each half is transmitted over data lines 114. However, the data information is delivered by microprocessor 100 at twice the clocking speed of the EDO RAM 106. Accordingly, bus exchanger 116 receives each half of the data information, then interleaves the upper and lower halves into a single data stream, represented by data lines 118a and 118b. Bus exchanger 116 then clocks the interleaved data therein to EDO RAM card 104 at the appropriate clocking speed. It can be appreciated that other data bus interface arrangements may be utilized by microprocessor 100 including providing the data in a single stream.

Figure 2:
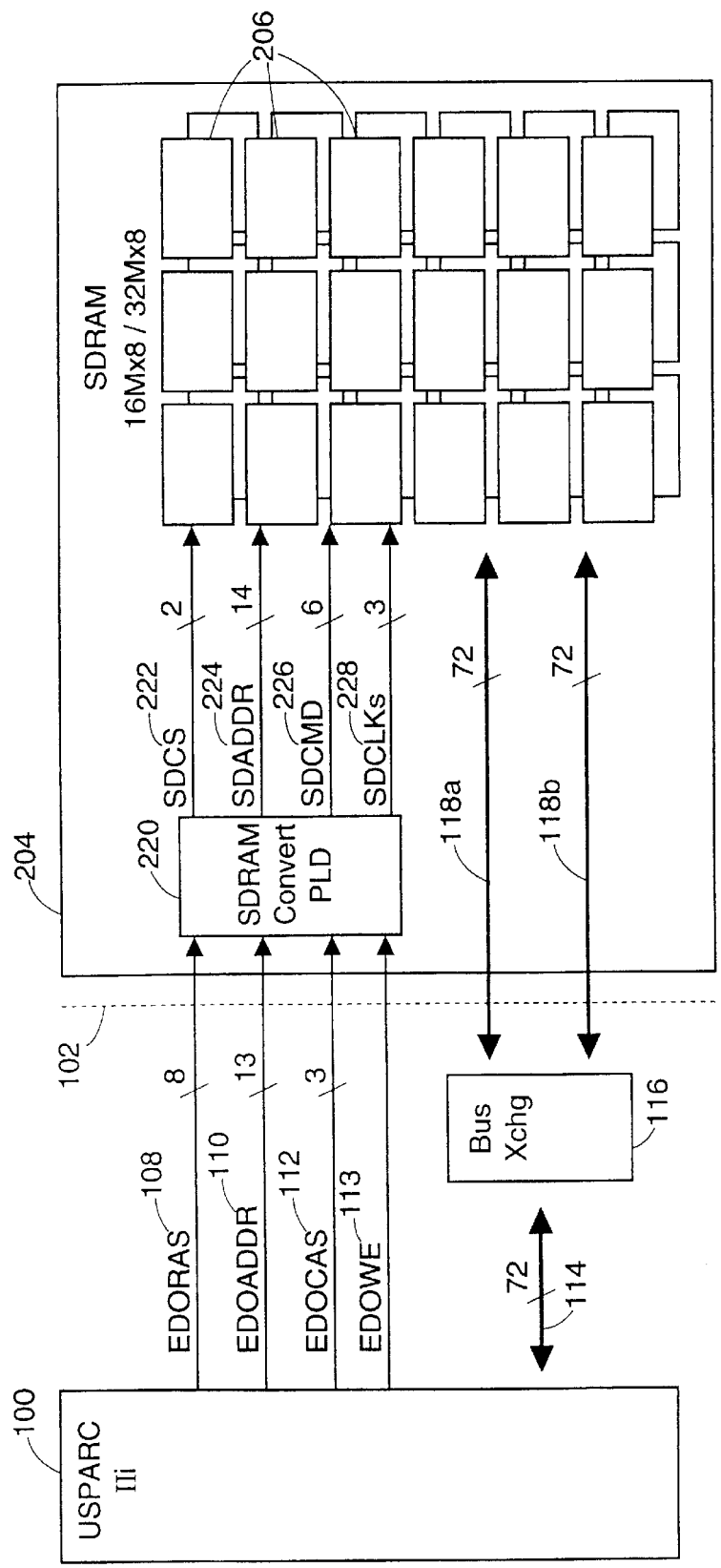
FIG. 2 is a block diagram of an electronic system interfaced to SDRAM through a signal conversion arrangement employed in the preferred embodiment of the invention.

Referring to FIG. 2, a system incorporating the preferred embodiment of the invention is shown in SDRAM card 204 interfacing with microprocessor 100. SDRAM card 204 is inserted in bus 102, thereby allowing communications with microprocessor 100. SDRAM card 204 appears to bus 102 to be connectively, electrically and functionally equivalent to an EDO RAM card 104. Accordingly, while the program controlling microprocessor 100 has been designed to communicate only with EDO RAM 106, SDRAM card 204 may be used in place of a EDO RAM card 104.

SDRAM card 204 comprises signal converter arrangement 220 and banks of SDRAM 206. Signal converter arrangement 220 receives control signals EDO RAS 108, EDO ADDR 110, EDO CAS 112 and EDO WE 113 from microprocessor 100 through bus 102. From these control signals, signal converter arrangement 220 generates SDRAM controlling signals, including synchronous chip select (SD CS) signals 222, synchronous address (SD ADDR) signals 224, synchronous DRAM command (SD CMD) signals 226A–E and synchronous DRAM clock (SD CLK) 228. Further descriptions of these signals are provided later. Redundant signals are provided to ensure signals have sufficient drive current for elements in card 204. As with EDO RAM 104 cards (FIG. 1), data for SDRAM 206 is transmitted via bus exchanger 116.

In the preferred embodiment, signal converter arrangement 220 comprises a plurality of logic gates and latches arranged to produce output signals from input signals. Accordingly, in the preferred embodiment, signal converter arrangement 220 is implemented in a programmable logic device (PLD) such as EPM 3128 ATC 100-5, available from Altera Corporation of San Jose, Calif. It can be appreciated that comparable discrete logic and latch elements, an ASIC or a software controlled signalling arrangement may be employed to process the input signals and generate the output signals of signal converter arrangement 220.

Figure 3:
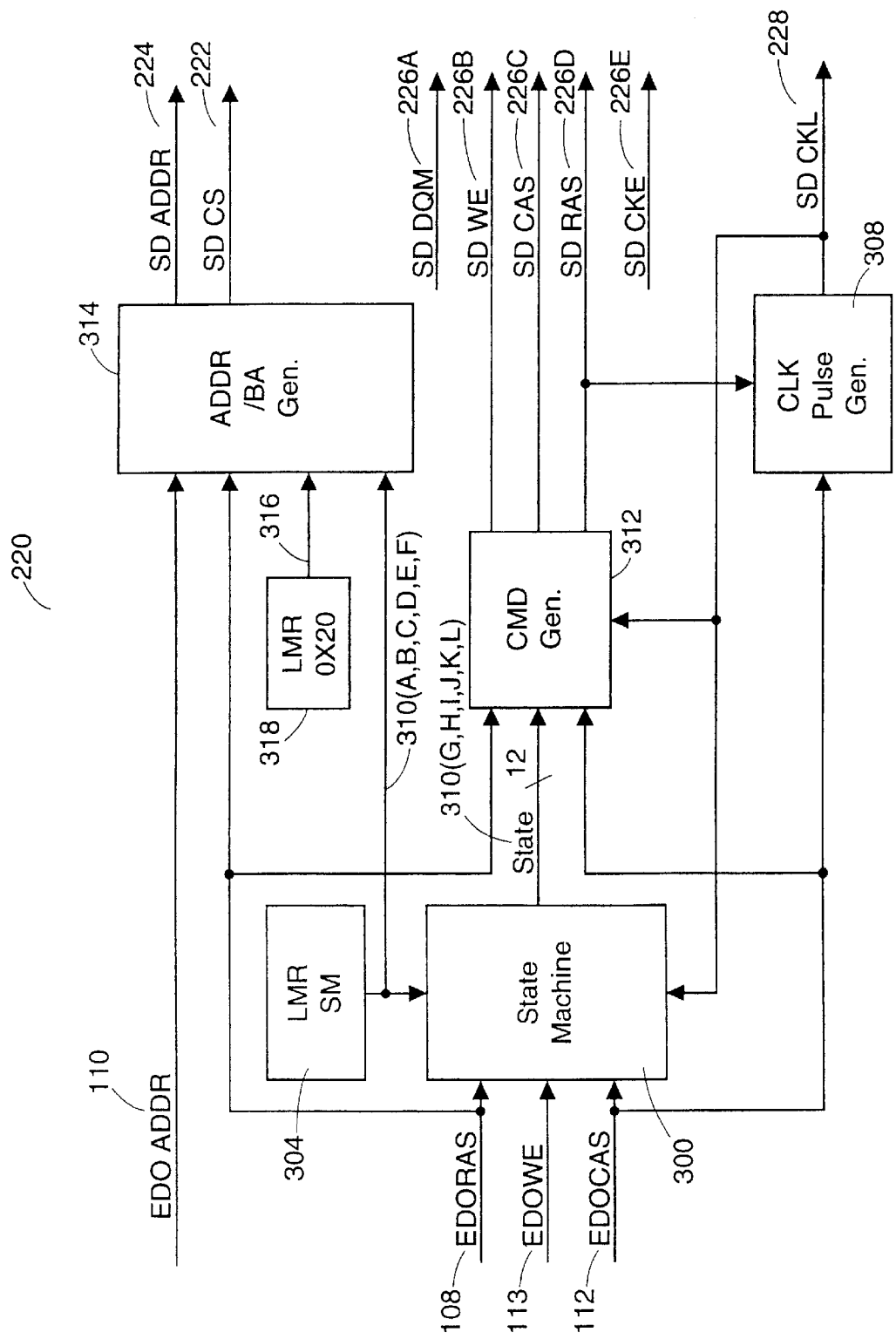
FIG. 3 is a detailed block diagram of the signal conversion arrangement of FIG. 2.

Referring to FIG. 3, signal converter arrangement 220 comprises state machine 300, Load Mode Register (LMR) state machine 304, clock pulse generator 308, command generator 312, address/bank activate generator 314 and LMR register 318.

State machine 300 provides a series of output signals to SDRAM 206 bus 102, depending on its current state. States are entered by asynchronous events corresponding to the EDO input signals. States are exited via the subsequent clock pulse SD CLK signal 228 generated by the state, itself the current state of state machine 300 and inputs received in the previous state of state machine 300. Inputs to state machine 300 include EDO RAS signal 108, EDO WE signal 113, EDO CAS signal 112, state signals 310(A–F) from LMR state machine 304 and SD CLK signal 228 from clock pulse generator 308. Six state signals 310G–310L are generated by state machine 300 (as will be described later) which control operation of SDRAM 206 according to instructions provided by the program operating on microprocessor 100.

Command generator 312 generates synchronous command signals 226A to 226E for SDRAM 206, which are comparable synchronous signals to asynchronous signals EDO RAM control signals generated by microprocessor 100. Input signals for command generator 312 include state signals 310A–310L, EDO RAS signal 108, EDO CAS signal 112 and SD CLK signal 228 and others (described later). Outputs of command generator 312 include synchronous DRAM Data Ready (SD DQM) signal 226A, synchronous DRAM write enable (SD WE) signal 226B, column address strobe (SD CAS) signal 226C and row address strobe (SD RAS) signal 226D. In the preferred embodiment, clock enable (SD CKE) signal 226E and SDRAM DQM signal 226A are not used for the memory configuration implemented. It can be appreciated that other memory implementations may utilise SD CKE signal 226E and SD DQM signals 226A to control access to appropriate memory banks.

Address/bank activate generator 314 generates control and address signals to identify a SDRAM device 206 corresponding to an address at EDO address inputs. SD address (SD ADDR) signals 224 and SD chip select (CS) signals 222 are provided to SDRAM 206. Inputs to address/bank activate generator 314 include EDO ADDR signals 110, EDO RAS signal 108, state signals 310(A–F) from LMR state machine 304 and output signals 316 from LMR value register 318.

Clock pulse generator 308 generates SD CLK signal 228, which is the main clocking signal used by SDRAM 206. An important aspect of clock pulse generator 308 is that while SD CLK pulses 228 are generated asynchronously, SD CLK pulses 228 still meet the minimum timing aspects of SDRAM 206 which allow SD CLK pulses 228 to correctly control data signals for SDRAM 206. Inputs for clock pulse generator 308 include EDO CAS signal 112 and SD RAS signal 226D. Output SD CLK signal 228 is fed to state machine 300, command generator 312 and the SDRAM 206.

Figure 4:
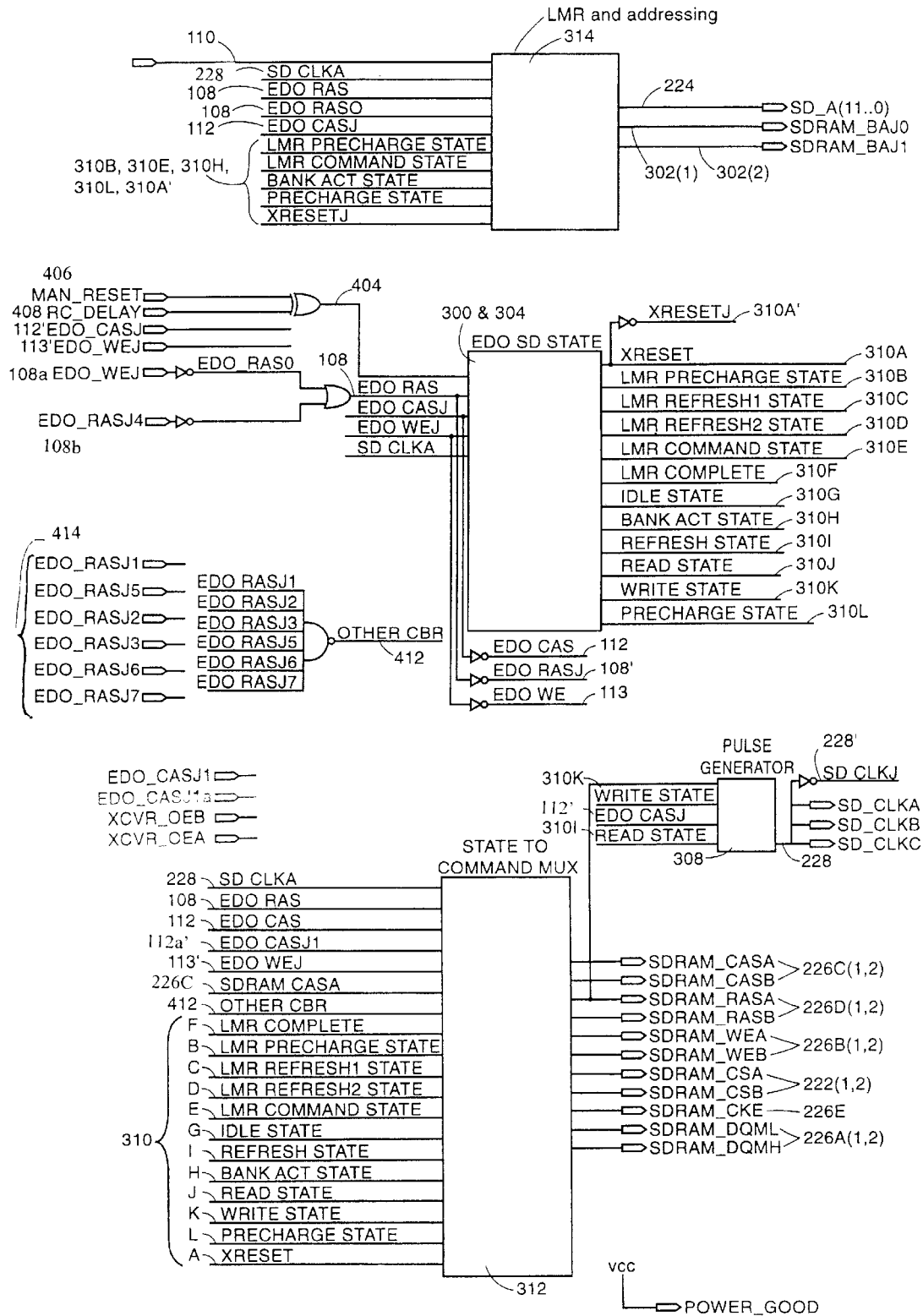
FIG. 4 is another detailed block diagram with input and output signal information of the signal conversion arrangement comprising a state machine, a LMR state machine, a command generator, a clock pulse generator and an address generator of FIG. 2.

Referring to FIG. 4, block elements of state machine 300, LMR state machine 304 and command generator 312 of signal converter arrangement 220 are shown. In the memory implementation for the embodiment, two RAS banks are controlled by state machine 300. The control signals for the banks are RASJ0 signal 108a and RASJ4 signal 108b. A manual reset signal 406 and a power-on reset signal 408 with an external delay are also provided in the embodiment.

For state machine 300, input EDO RAS signal 108 is generated from the signal resulting from the OR'ing of inverted EDO RASJ0 signal 108a with inverted EDO RASJ4 signal 108b. The EDO RASJ0 signal 108a and EDO RASJ4 signal 108b originate from microprocessor 100. For the sake of simplicity, hereafter EDO RASJ0 signal 108a and RASJ4 signal 108b are identified by the reference number 108. RC Delay signal 404, which may be generated locally on SDRAM card 204, is an input signal to state machine 300.

Upon initialization, LMR state machine 304 automatically generates a series of signals. Also, using the above-mentioned input signals, state machine 300 generates additional output signals using various logic and latching combinations (as described later). Together, LMR state machine 304 and state machine 300 generate the following signals:

XRESET signal 310A;
LMR PRECHARGE STATE signal 310B;
LMR REFRESH1 STATE signal 310C;
LMR REFRESH2 STATE signal 310D;
LMR COMMAND STATE signal 310E;
LMR COMPLETE signal 310F;
IDLE STATE signal 310G;
BANK ACT STATE signal 310H;
REFRESH STATE signal 310I;
READ STATE signal 310J;
WRITE STATE signal 310K; and
PRECHARGE STATE signal 310L.

It can be appreciated that LMR state machine 304 and state machine 300 may be combined in another embodiment into a single state machine to produce the same output signals 310(A–L) in response to the same input signals.

Inverted signals of certain previously identified signals are also generated and used by state machine 300. Generally, an inverted signal is distinguished from its non-inverted version by a "J" suffix. In particular, EDO CASJ signal 112' is an inverted signal of EDO CAS signal 112; EDO RASJ signal 108' is an inverted signal of EDO RAS signal 108; and EDO WE signal 113 is an inverted signal of EDO WEJ 113'; XRESETJ signal 310A' is an inverted signal of XRESET signal 310A.

For a convention for the description of signal operations, input signals are identified, then the logical operation (e.g. AND'ing OR'ing, XOR'ing, NANDing) performed are identified and output signals are identified. It will be understood by those skilled in the art that the logical operations are implemented using known techniques in the art, such as implementing appropriate AND, OR, XOR and NAND gates.

The inputs for command generator 312 include: command signals 310A–310L (as described earlier), SD CLK signal 228, EDO RAS signal 108, EDO CAS signal 112, EDO CASJ1 signal 112a', EDO WEJ signal 113', SDRAM CASA 226C (which is an output of command generator 312 fed back into it) and OTHER CBR signal 412. OTHER CBR signal 412 is generated from a signal resulting from NAND'ing EDO RASJ1–J3 and J5–J7 signals together, represented collectively by signals 414. EDO RASJ1–J3 and J5–J7 signals 414 are generated when other banks of memory perform a refresh operation (signified by a CAS Before RAS "CBR" signal sequence) to synchronise with other refresh cycles. Signals 414 are also used to reset SD CAS signal 226C. In the embodiment, to enhance signal timing response characteristics of the converter 220, SD CAS signal 226C is activated from EDO CAS signal 112, but is deasserted by OTHER CBR signal 412 in cases where a refresh was not intended for an SDRAM card 204.

Outputs for command generator 312 include multiple versions of each of signals 226A–226E and SD CS 222. Multiple signals are provided for drive strength for multiple memory device loads. Each instance of the multiple signals is functionally identical to the others. SDRAM DQM signal 226A is duplicated in SDRAM DQMH signal 226A(1) and SDRAM DQML signal 226A(2). SD WE signal 226B is produced as SDRAM WEA signal 226B(1) and SDRAM WEB signal 226B(2). SD CAS signal 226C is produced as SDRAM CASA signal 226C(1) and SDRAM CASB signal 226C(2). SD RAS signal 226D is produced as SDRAM RASA signal 226D(1) and SDRAM RASB signal 226D(2). SD Chip Select (SD CS) signal 222 is produced as SDRAM CSA signal 222(1) and SDRAM CSB signal 222(2). SD CKE signal 226E is produced in a single version only. For the sake of simplicity, further references to these signals do not include the suffix (1) or (2), unless required.

The inputs for clock pulse generator 308 are WRITE STATE signal 310K (an output from state machine 300), EDO CASJ signal 112' and READ STATE signal 310I (an output from state machine 300). Three identical output clock signals are generated, namely SD CLKA, CLKB and CLKC. For simplicity, the output signals are collectively referred to as one signal, namely SD CLK signal 228. An inverted version of SD CLK signal is also provided, namely SD CLKJ signal 228'. The inverted signal is utilised in the PLD of converter 220 to reset selected latched outputs.

Inputs to address/bank activate generator 314 include:
EDO ADDR signals 110;
SD CLK signal 228;
EDO RAS signal 108;
EDO CASJ signal 112';
LMR PRECHARGE STATE signal 310B;
LMR COMMAND STATE signal 310E;
BANK ACT STATE signal 310H;
PRECHARGE STATE signal 310L; and
XRESETJ signal 310A'.

Outputs for address/bank activate generator 314 include:
SD A (11 . . . 0) signals 224;
SDRAM BAJ0 signal 302(1); and
SDRAM BAJ1 signal 302(2).

RC Delay signal 404 is generated by XOR'ing MAN RESET signal 406 with RC Delay signal 408.

Figure 5I:
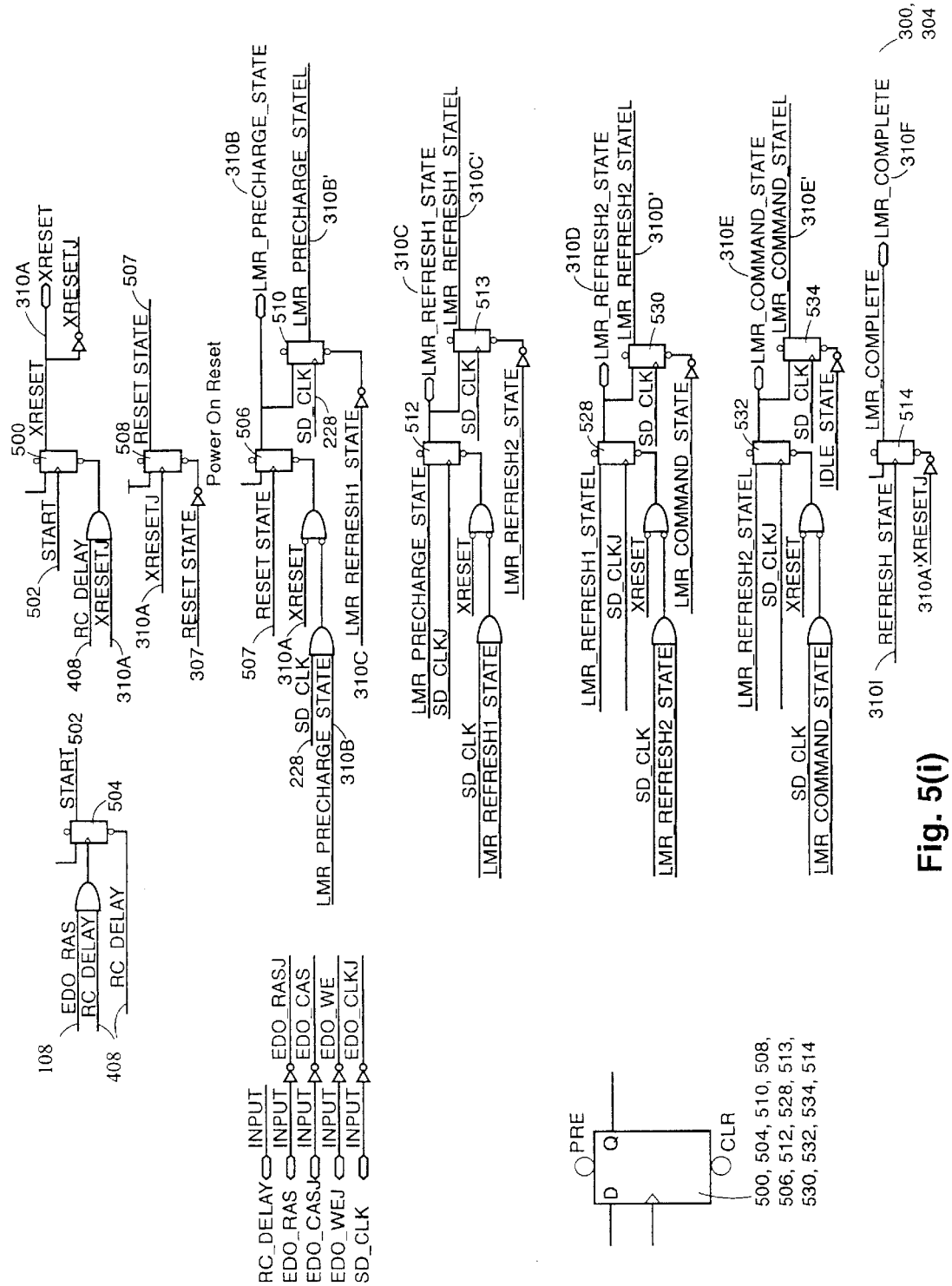
FIGS. 5 (i) and (ii) together are a block diagram of input and output signals and logic and control elements of the signal conversion arrangement of FIG. 4.
Figure 5:
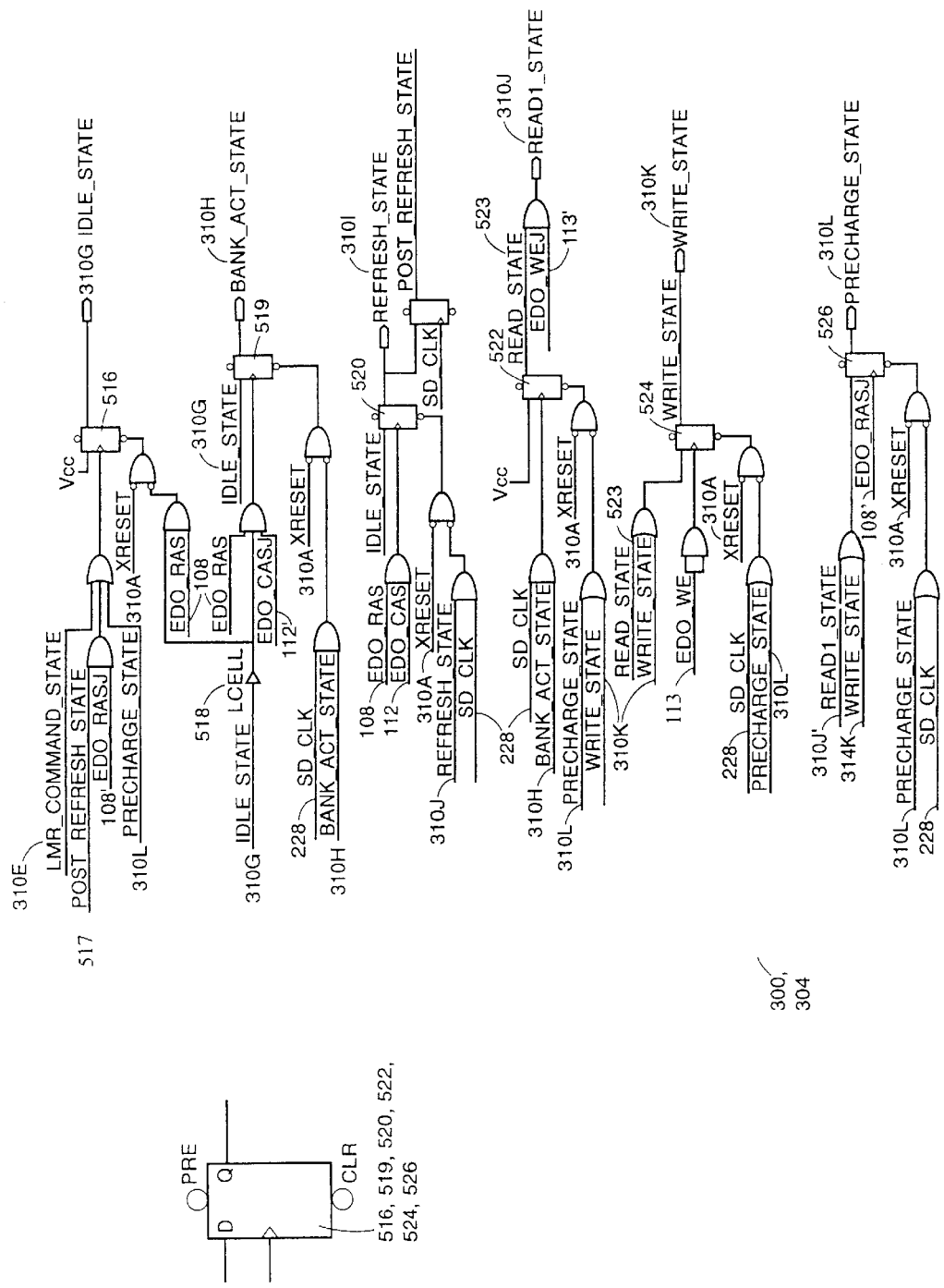

Referring to FIGS. 5(i), 5(ii) and 6, state signals 310A to 310L for state machine 300 are each generated by a combination of the input signals described above processed through various logic gates and latches. State signals 310A to 310L are each individually synchronised through individual latches. Details for state signals 310A through 310L follow wherein first, aspects of the heuristics of state machine 300 shown in FIG. 6 are described, then aspects of signal processing arrangements to implement the heuristics shown in FIGS. 5(i) and 5(ii) are described.

Figure 6:
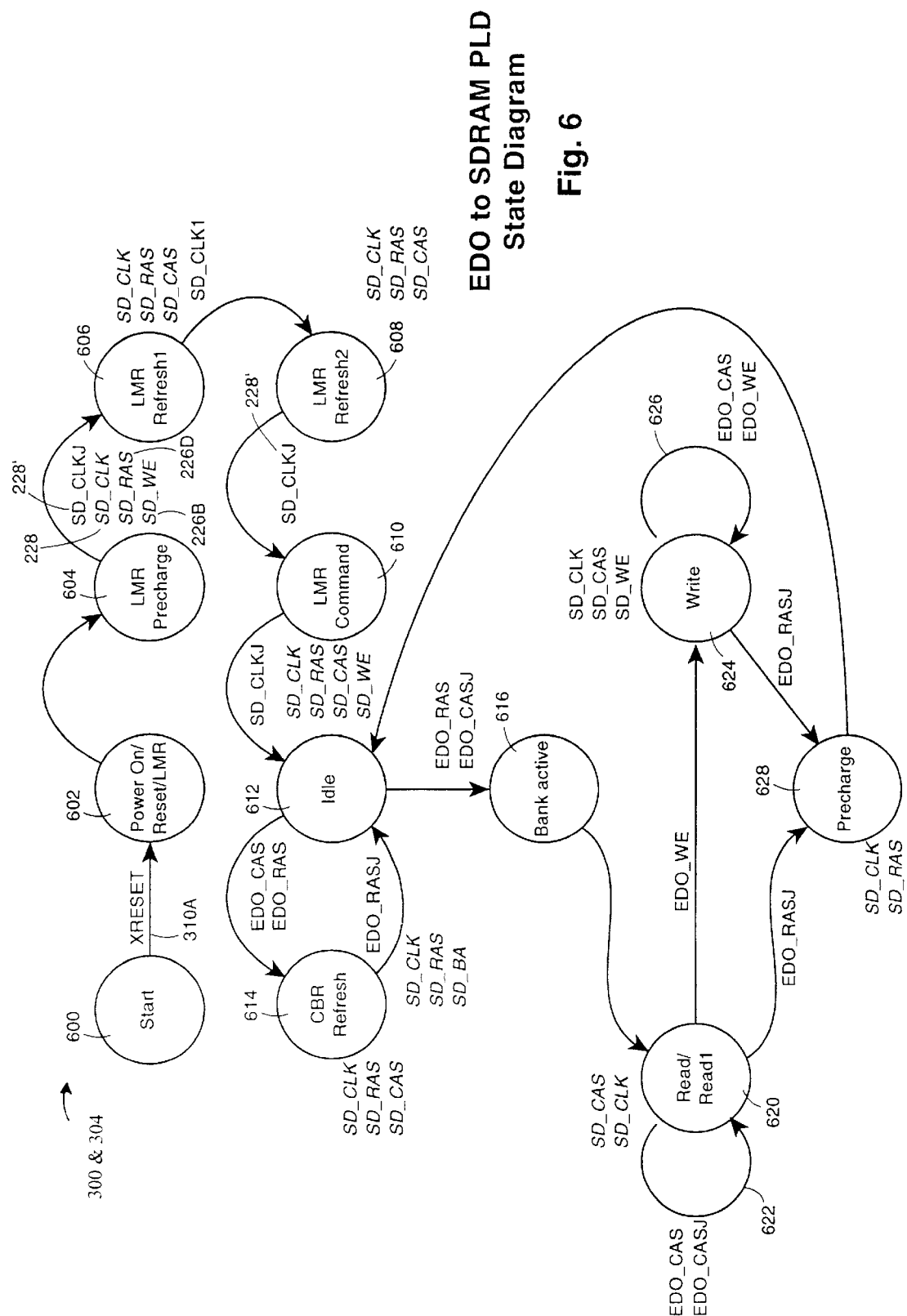
FIG. 6 is a state diagram associated with the signal conversion arrangement of FIG. 4.

Referring to FIG. 6, operating aspects of state machine 300 and LMR state machine 304 are illustrated. At start 600, LMR state machine 304 is activated and then receives XRESET signal 310A, placing state machine 300 into the Power On/Reset/LMR state 602. Next, LMR state machine 304 automatically progresses to the LMR PRECHARGE state 604. When LMR PRECHARGE state 604 receives the falling edge of SD CLKJ signal 228', generated from clock pulse generator 308, state machine 300 causes generation of another SD CLK signal 228, SD RAS signal 226D and SD WE signal 226B. State machine 300 then progresses to LMR REFRESH1 state 606.

Referring to FIG. 5(i), XRESET signal 310A is generated from the output of latch 500. Data for latch 500 is provided START signal 502. Latch 500 is clocked by the logical AND'ing of RC DELAY signal 408 with XRESETJ signal 310A'. RC DELAY signal 408 is used to detect a Power on Reset of the signal converter arrangement. It can be appreciated that the microprocessor 100 or other external source may provide an equivalent signal, eliminating the need for RC DELAY signal 408. START signal 502 is generated by latch 504 whose clock is generated from the logical AND'ing of RC DELAY signal 408 with EDO RAS signal 108. Data for latch 504 is a high logical value. Latch 504 is reset by RC DELAY signal 408.

RESET STATE signal 507 is generated from the output of latch 508 which is clocked by signals XRESETJ signal 310A' and reset by fed back RESET STATE signal 507. Data for latch 508 is held high. Latch 508 is cleared on power up by an inverted RESET STATE signal 507.

LMR PRECHARGE STATE signal 310B is generated from the output of latch 506. Clock for latch 506 is RESET STATE signal 507; clear input of latch 506 is the result of: the logical AND'ing of SD CLK signal 228 with LMR PRECHARGE STATE signal 310B, which then is inverted and then AND'ed with an inverted XRESET signal 310A. Effectively, SD CLK signal 228 resets latch 506 only when the LMR precharge state is active. XRESET also clears the latch 506.

LMR PRECHARGE STATEL signal 310B' is a delayed LMR PRECHARGE STATE signal 310B. Signal 310B' is produced from latch 510. Data for latch 510 is LMR PRECHARGE STATE signal 310B. Latch 510 is clocked by SD CLK signal 228 and is cleared by an inverted version of the next state signal, namely LMR REFRESH1 STATE signal 310C.

Referring to FIG. 6 and LMR REFRESH1 state 606, when SD CLK signal 228 is received, LMR state machine 304 progresses to LMR REFRESH2 state 608. SD CLK signal 228, SD RAS signal 226D and SD CAS signal 226C are generated to cause a SDRAM REFRESH command to be initiated for SDRAM 206. Next, LMR Command state 610 is entered is upon the receipt of the next SD CLK pulse 228'. Data in LMR Register 318 is then transferred to the device programming registers (not shown) of SDRAM 206. This is done by driving the SDRAM address bus with the LMR Register value. In the embodiment the value is 020x (hexadecimal).

Referring to FIG. 5(i), LMR REFRESH1 STATE signal 310C corresponding to state 606 is generated from the output of latch 512. Data for latch 512 is LMR PRECHARGE STATEL signal 310B' from latch 510. SD CLKJ signal 228' clocks latch 512. To control the clear input of latch 512, LMR REFRESH1 STATE signal 310C is fed back to be AND'ed with SD CLK signal 228, which is then inverted, then AND'ed with an inverted XRESET signal 310A.

LMR REFRESH STATEL signal 310C' is a delayed LMR REFRESH STATE signal 310C. Signal 310C' is produced from latch 513. Data for latch 513 is LMR REFRESH STATE signal 310C. Latch 513 is clocked by SD CLK signal 228 and is cleared by an inverted version of the next state signal, namely LMR REFRESH2 STATE signal 310D.

LMR REFRESH2 STATE signal 310D is generated from latch 528. Input for latch 528 is LMR REFRESH STATEL signal 310C'; clocking is from SD CLKJ signal 228'. To control the clear input of latch 528, LMR REFRESH2 STATE signal 310D is fed back to be AND'ed with SD CLKJ signal 228', which is inverted, then AND'ed with an inverted XRESET signal 310A.

LMR REFRESH2 STATEL signal 310D' is an inverted and delayed LMR REFRESH2 STATE signal 310D. Signal 310D' is produced from latch 530. LMR REFRESH2 STATE signal 310 is the data for latch 530. Latch 530 is clocked by SD CLK signal 228 and is cleared by an inverted version of the next state signal, namely LMR COMMAND STATE signal 310E.

LMR COMMAND STATE signal 310E is generated from latch 532. Input data for latch 532 is LMR REFRESH2 STATEL signal 310D'; clocking is from SD CLKJ signal 228'. To control the clear input of latch 528, LMR COMMAND STATE signal 310E is fed back to be AND'ed with SD CLK signal 228, which is inverted, then AND'ed with an inverted XRESET signal 310A.

LMR COMMAND STATEL signal 310E' is a delayed LMR COMMAND STATE signal 310E. Signal 310E' is produced from latch 534. Data for latch 534 is LMR COMMAND STATE signal 310E. Latch 534 is clocked by SD CLK signal 228 and is cleared by an inverted version of the IDLE STATE signal 310G.

LMR COMPLETE signal 310F is generated from the output of latch 514. Data for latch 514 is tied to a logical high value. Clocking for latch 514 is provided by REFRESH STATE signal 310I and the clear input is associated with the XRESETJ signal 310A'.

It will be appreciated that it is possible to use external events to co-ordinate and trigger the progression through the LMR states. One implementation may use an EDO REFRESH signal to trigger the progression. It will be appreciated that other triggering means may be used which are known in the art.

Referring to FIG. 6, from LMR COMMAND state 610 upon the receipt of the next SD CLKJ signal 228', another SD CLK signal 228 is generated as well as SDRAM RAS signal 226D, SDRAM CAS signal 226C and SDRAM WE signal 226B, then enters IDLE state 612. At this point, state machine 300 generates the state signals.

Referring to FIG. 5(ii), IDLE STATE signal 310G is generated by the output of latch 516. Data for latch 516 is tied to a logical high value. Clocking for latch 516 is provided by a two stage signal. First, POST REFRESH STATE signal 517 is AND'ed with EDO RASJ signal 108'. Next, the result of the first stage is then OR'ed with LMR COMMAND STATE signal 310E and PRECHARGE STATE signal 310L. Clearing of latch 516 is controlled by another two-stage signal. First, a delayed IDLE STATE signal 310G is AND'ed with EDO RAS signal 108. Next, the result of the first stage is inverted, then is AND'ed with an inverted XRESET signal 310A. The delay for IDLE STATE signal 310G is provided by LCELL 518.

Referring to FIG. 6, from IDLE state 612, state machine 300 may either CBR REFRESH state 614 or BANK ACTIVATED state 616.

Referring to FIG. 5(ii), the BANK ACTIVATE state 616 is entered when EDO RAS signal 108 is asserted and EDO CAS signal 112 is inactive and IDLE STATE signal 310G is asserted. BANK ACT STATE signal 310H is generated by the output of latch 519. Data for latch 519 is provided by IDLE STATE signal 310G. Latch 519 is clocked by an IDLE STATE signal 310G delayed by LCELL 518 which is AND'ed with EDO RAS signal 108 and EDO CASJ signal 112'. Latch 519 is cleared by a signal resulting from the logical AND'ing of an inverted XRESET signal 310A with an inverted signal resulting from the AND'ing of SD CLK signal 228 with BANK ACT STATE signal 310H. For the BANK ACT STATE timing, the state of the high order RAS address line RA12 and additional RAS strobe are used to determine the state of the bank address lines. Further details on the activation of banks are provided later.

Referring to FIG. 6, for state machine 300 to move from IDLE state 612 to a CBR REFRESH state 614, EDO CAS signal 112 and EDO RAS signal 108 must be generated by microprocessor 100. Upon the receipt of rising edge of EDO RAS signal 108, SD CLK signal 228, SD RAS signal 226D and SD CAS signal 226C are issued by state machine 300 and state machine 300 returns to IDLE state 612.

Referring to FIG. 5(ii), REFRESH STATE signal 310I is generated from the output of latch 520. Data for latch 520 is provided by IDLE STATE signal 310G. Clocking is provided by the logical AND of EDO RAS signal 108 with EDO CAS signal 112. Latch 520 is reset by a signal resulting from the AND'ing of an inverted XRESET signal 310A with an inverted output of the REFRESH STATE signal 310J AND'ed with SD CLK signal 228.

Referring to FIG. 6, from IDLE state 612 for any read or write operation to occur in SDRAM 206, a bank of cells therein must be activated. Accordingly, upon the receipt of EDO RAS signal 108 and EDO CASJ signal 112', state machine 300 progresses to BANK ACTIVATE state 616. Herein, one bank of the memory locations identified by the address present on the address line is activated.

On a read operation, EDO CAS signal 112 and EDO WEJ signal 113' are provided by microprocessor 100 to the state machine 300, in accordance with EDO RAM operating specifications. Then, state machine 300 generates an activate command followed by a read command sequence, which must be provided to SDRAM 206 per known SDRAM operating specifications. Accordingly, upon receipt of EDO CAS signal 112 and EDO WEJ signal 113', state machine 300 generates SD CLK signal 228 and SD CAS signal 226C and proceeds to READ/READ1 state 620.

When SDRAM device 206 is configured with a CAS latency of 2, read operations are conducted in two stages, requiring two clocks pulses. When the read operation is initiated, a first clock pulse causes the SDRAM 206 to process the read operation. With the second clock pulse, the data in SDRAM 206 is provided to the data bus. It will be appreciated by those skilled in the art that when a different number of CAS latency periods are programmed for an SDRAM device 206, then a comparable number of read stages and clock pulses are required to complete the command. State machine 300 may be modified accordingly to provide such appropriate number of read stages and clock pulses.

Accordingly, for the first stage of the read operation in READ/READ1 state 620, the column address and the SDRAM read signal series operations are generated. For the second stage the issuance of the next SD CLK signal 228 occurs and causes data to be available to be read from the cell at the intersection of the row and column activated by the address bus. During the first and second stage, state machine 300 remains in READ/READ1 state 620, as indicated by arrow 622.

Further strobing of signals EDO CAS 112 and EDO WE 113 by microprocessor 100 cause additional burst read operations to occur at the cell identified by the address present at EDO ADDR lines 110. In a burst read operation, state machine 300 remains throughout in READ/READ1 state 620 as noted by arrow 622.

Upon completion of a read command, microprocessor 100 issues a EDO RASJ signal 108' and state machine 300 progresses to PRECHARGE state 628. Further detail on PRECHARGE state 628 is provided later.

Referring to FIG. 5(ii), READ1 STATE signal 310J is generated by the logical AND'ing of a READ STATE signal 523 with EDO WEJ signal 113'. READ STATE signal 523 is generated from the output of latch 522. Data for latch 522 is tied to a logical high value. Latch 522 is clocked by a signal resulting from the logical AND of SD CLK signal 228 with BANK ACT STATE signal 310H. Latch 522 is reset by a signal resulting from the AND'ing an inverted XRESET signal 310A with an inverted signal resulting from the OR'ing of WRITE STATE signal 310K with PRECHARGE STATE signal 310L. Further aspects on the timing and generation of the SD read operation signals are described later.

Referring to FIG. 6, to execute a write operation from a BANK ACTIVATE state 616, an EDO CAS signal 112 followed by an EDO WE signal 113 must be issued by microprocessor 100. In the preferred embodiment, progressing from BANK ACTIVATE state 616 to WRITE state 624 flows, briefly, through READ/READ1 state 620. The existence of the EDO WE signal 113 cause state machine 300 to progress from READ/READ1 state 620 to WRITE state 624 without executing a read command sequence.

When state machine 300 enters WRITE state 624, command generator 312 issues a SDRAM write command with its column address. Data from microprocessor 100 is placed on data lines 114, which is transferred to data lines of SDRAM card 204 through bus 118a/b (as described earlier), thereby enabling the data to be written to the appropriate SDRAM address provided to SDRAM 206. Further timing and signal generation aspects of the SD address are provided later.

Further strobing of signals EDO CAS 112 and EDO WE 113 by microprocessor 100 cause additional burst write operations to occur at the cell identified by the address present at EDO ADDR lines 110. In this operation, state machine 300 remains in WRITE state 624 as noted by arrow 626.

When a write operation is completed, microprocessor 300 issues EDO RASJ signal 108', to indicate the end of the operation and state machine 300 progresses to PRE-CHARGE state 628.

Referring to FIG. 5(ii), WRITE STATE signal 310K is generated by the output of latch 524. Data for latch 524 is provided by OR'ing the READ STATE signal 523 with the WRITE STATE signal 310K. Clocking is provided by the EDO WE signal 113. Clearing is provided by the AND'ing of an inverted XRESET signal 310A with an inverted signal resulting from the AND'ing of the SD CLK signal 228 with PRECHARGE STATE signal 310L.

Referring to FIG. 6, from PRECHARGE 628, precharge signals are provided to SDRAM 206 and state machine 300 returns to IDLE state 612.

Referring to FIG. 5(ii), PRECHARGE STATE signal 310L is generated by the output of latch 526. Data for latch 526 is provided by logical OR of READ1 STATE signal 310J with WRITE STATE signal 310K. Clocking is provided by EDO RASJ signal 108'. Clearing of latch 526 is provided by the same signal provided to clear latch 524 described above.

Figure 7I:
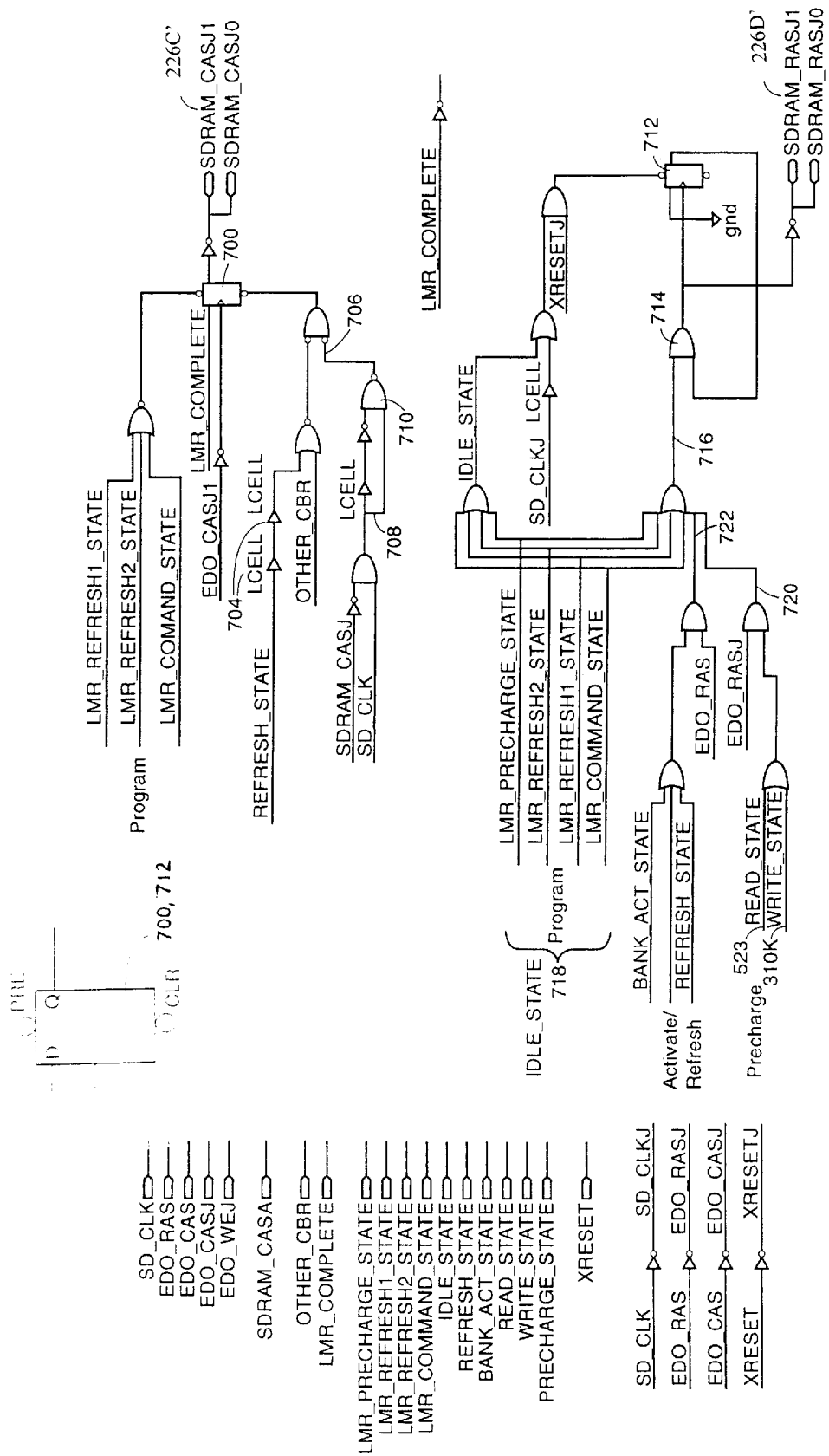
FIGS. 7 (i) and (ii) together are a block diagram of input and output signals and logic and control elements of the command generator of FIG. 4.

Referring to FIGS. 7(i) and (ii), aspects of SDRAM CAS signal 226C and SDRAM RAS signal 226D generation are shown for read, write and refresh operations. In FIG. 7(i), SDRAM CASJ0 and SDRAM CASJ1 signals 226C are produced by the output of latch 700. The preset control for latch 700 is provided by a signal resulting from logical NOR'ing of LMR REFRESH1 STATE signal 310C, LMR REFRESH2 STATE signal 310D and LMR COMMAND STATE signal 310E. Accordingly, a SD CAS assertion for the SDRAM card 204 is provided when these states are active. Data for latch 700 is provided by LMR COMPLETE signal 310F. Clocking for latch 700 is provided by an inverted EDO CASJ1 signal 410'. This provides SD CAS assertion from EDO CAS for normal operation.

Latch 700 is cleared by AND'ing two signals together. The first signal 702 is generated by the NOR'ing of REFRESH STATE signal 310I, which is delayed by two LCELLS 704, with OTHER CBR signal 412. The second signal 706 is generated by inverted SDRAM CASA signal 226C AND'ed with SD CLK signal 228 producing signal 708. Signal 708 is fed to NAND gate 710 with a delayed and inverted version of signal 708 to create second resultant signal 706.

SDRAM RASJ0 and SDRAM RASJ1 signals 226D' are pulses generated by the output of latch 712. Clocking for latch 712 is provided by a signal resulting from AND'ing the fed back output of latch 712 with signal 716. Signal 716 is generated from an OR'ing of the LMR PRECHARGE STATE signal 310B, LMR REFRESH2 STATE signal 310D, LMR REFRESH1 STATE signal 310C, and LMR COMMAND STATE signal 310E (herein collectively referred to as LMR signals 718) with signals 720 and 722. Signal 722 results in part from BANK ACT STATE signal 310H OR'ed with REFRESH STATE signal 310I. That signal is AND'ed with EDO RAS signal 108 to create signal 722 which triggers SDRAS signal 226D for Bank Activate signal 310H and Refresh signal 310I respectively. Signal 720 is created by OR'ing READ STATE signal 523 with WRITE STATE signal 310K, which triggers SDRAS signal 226D for a precharge command. This signal is AND'ed with EDO RASJ signal 108' to produce signal 720. Data for latch 712 is held to a logical low value. Preset for latch 712 is generated from the OR'ing of LMR signals 718 with a delayed version of SD CLKJ signal 228'. The resulting signal is AND'ed with XRESETJ signal 310A' and fed to the preset input of latch 712.

Figure 7:
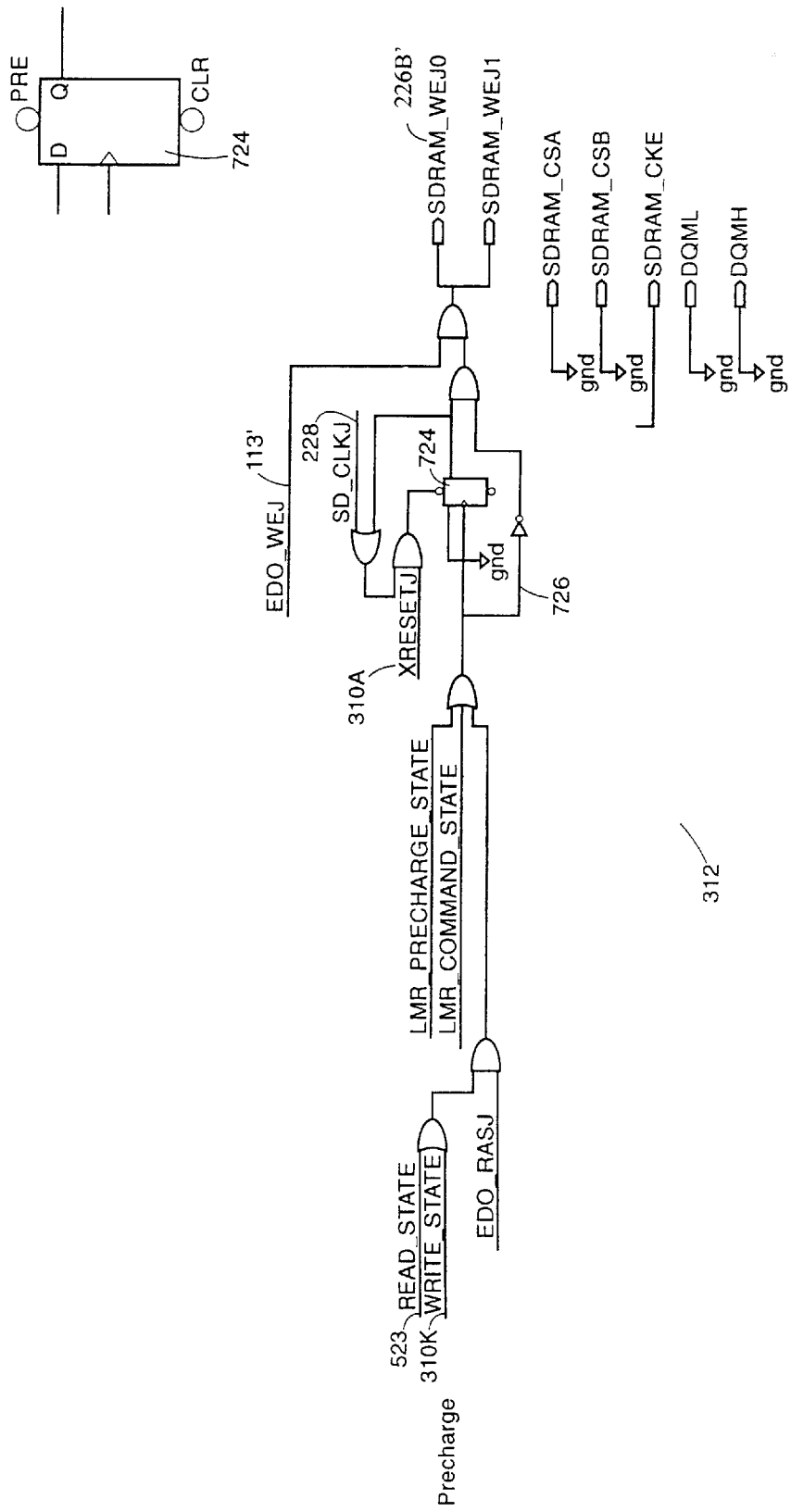

Referring to FIG. 7(ii), SDRAM WEJ0 and SDRAM WEJ1 signals 226B' are produced by a combination of the output of latch 724 AND'ed with EDO WEJ signal 113'. Clocking for latch 724 is provided by signal 726, which results from a three-stage cascaded logic arrangement. The first stage results from OR'ing READ STATE signal 523 with WRITE STATE signal 310K. The output of the first stage is AND'ed with EDO RASJ signal 108' to produce the second stage signal. The third stage signal results from OR'ing the second stage signal with LMR PRECHARGE STATE signal 310B and LMR COMMAND STATE signal 310E. The output of the third stage is fed to the clock input of latch 724.

The preset signal for latch 724 is generated from a signal resulting from OR'ing SD CLKJ signal 228' with an output of latch 724, which is then AND'ed with XRESETJ signal 310A' and fed to the preset input of latch 724. Accordingly, the preset is controlled in part by a delayed version of the output of latch 724.

The output of latch 724 is AND'ed with an inverted version of signal 726. Next, the output of the AND stage is further AND'ed with EDO WEJ signal 113' to create SDRAM WEJ0 and WEJ1 signals 226B'.

It can be appreciated that in addition to the command translation between EDO and SDRAM operation signals that must occur, translation of addresses must also be performed. EDO RAM addresses are not compatible with SDRAM addresses. Generally, SDRAM 206 has on-device banks providing faster performance and pipeline features not supported by EDO RAM. Accordingly, when translating EDO RAM addresses to SDRAM addresses, the appropriate bank address within the SDRAM 206 must be activated. Accordingly, for the preferred embodiment, the number of columns of accessible memory in SDRAM 206 populated on SDRAM card 204 must meet or exceed the number of columns identified by microprocessor 100. EDO RAS signal 108 and upper row addresses are used in the preferred embodiment to activate appropriate SDRAM 206 bank addresses as required. Table 1 identifies memory configurations and address mappings which may be implemented in an embodiment wherein microprocessor 100 is an ULTRASPARC IIi.

TABLE 1

| | | | | | | | |
|---|---|---|---|---|---|---|---|
| SDRAM memory configurations ||||||||
| System Memory | Device | Physical Banks | SDRAM devices | BA1 | BA0 | Row address | Column Address |
| 256 Mbytes | 128 bit (16 Mx8) | 1 | 18 | BNK0 | RA12 | RA11-RA0 | CA9-CA0 |

TABLE 1-continued

SDRAM memory configurations

| System Memory | Device | Physical Banks | SDRAM devices | BA1 | BA0 | Row address | Column Address |
|---|---|---|---|---|---|---|---|
| 512 Mbyte | 128 bit (16 Mx8) | 2 | 36 | BNK0 | RA12 | RA11-RA0 | CA9-CA0 |
| 512 Mbyte | 256 bit (32 Mx8) | 1 | 18 | BNK0 | BNK1 | RA12-RA0 | CA9-CA0 |
| 1 Gbyte | 256 bit (32 Mx8) | 2 | 36 | BNK0 | BNK1 | RA12-RA0 | CA9-CA0 |
| 1 Gbyte | 128 bit (16 Mx8) | 4 | 72 | BNK0 | RA12 | RA11-RA0 | CA9-CA0 |

BNK0 is set according to which EDO RAS is asserted in the pairs that comprise the physical bank, i.e. RAS0 assert is BNK0=0; RAS 1 assert is BNK0=1.

Figure 8:
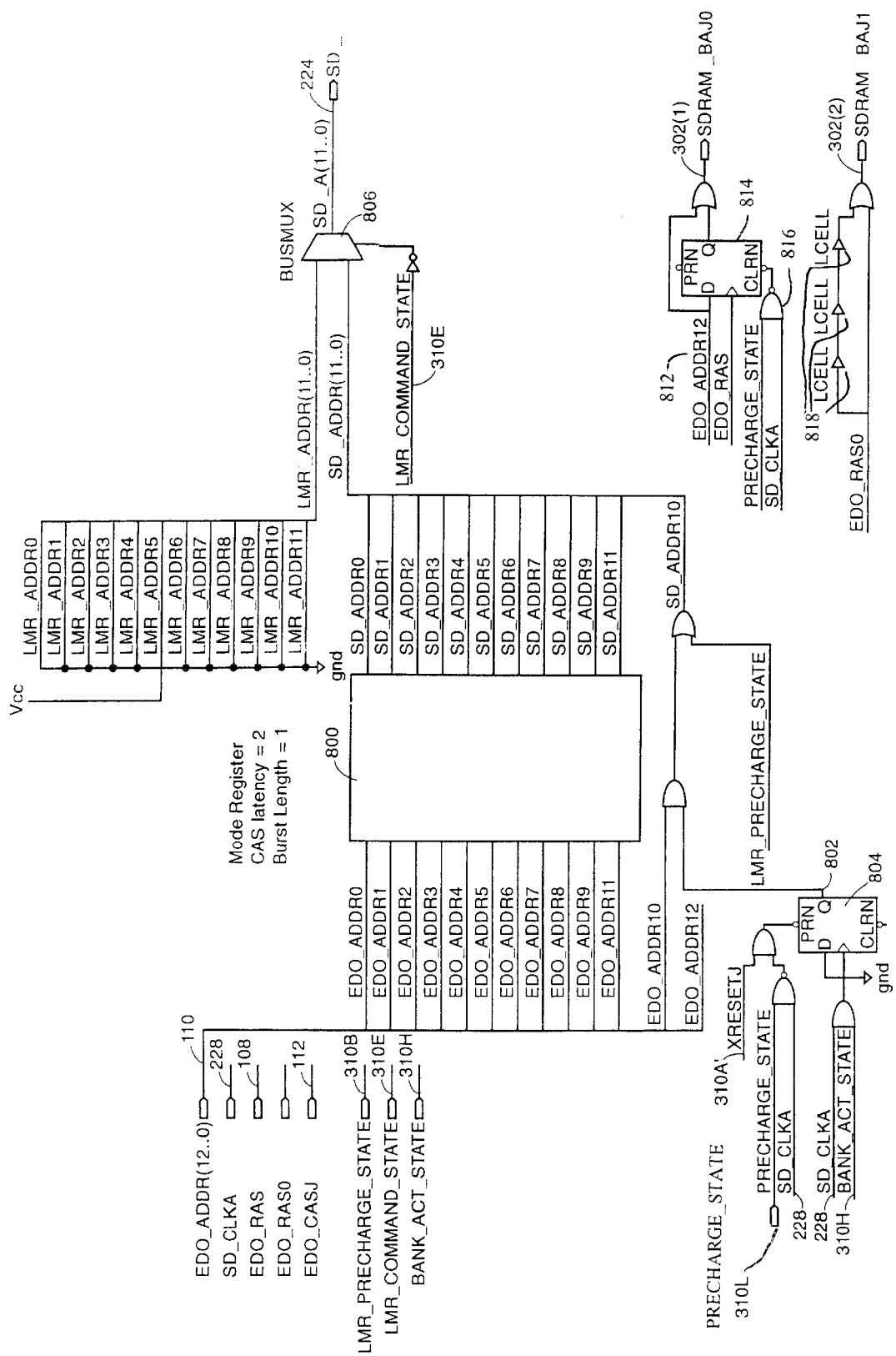
FIG. 8 is a block diagram of input and output signals and logic and control elements of the address generator of FIG. 4.

Referring to FIG. 8, EDO ADDR signal lines 110 for address lines (0–9,11) are used to generate comparable SD ADDR signal lines 224 for address lines (0–9, 11) through buffer 800 from the original EDO address signals generated by microprocessor 100. Buffer 800 provides a timing delay for the address lines used by SDRAM 206. Further details on the timing delay are provided below. SD ADDR line (10) is generated in part from signal 802, generated from latch 804. Latch 804 is clocked by a signal resulting from the AND'ing of SD CLK signal 228 with BANK ACT STATE signal 310H. The preset signal for latch 804 is generated from a signal resulting from the NAND'ing of PRECHARGE STATE signal 310L with SD CLK 228, which is AND'ed with XRESETJ signal 310A'. Signal 802 is AND'ed with EDO ADDR (10), and the result is OR'ed with LMR PRECHARGE STATE signal 310B to produce SD ADDR (10). During PRECHARGE, the state machines drives SD ADDR (10) to a high value for ALL BANK PRECHARGE as defined by SDRAM devices.

Thereafter, SD ADDR signals (0–11) are fed to one input channel of multiplexer 806. The other input channel of multiplexer 806 is tied to low and high logical values to represent LMR register value 020(hex), as is described later in detail. The input channel selected by multiplexer 806 is controlled by an inverted LMR COMMAND STATE signal 310E. In the preferred embodiment, the output of multiplexer 806 is provided to the appropriate row and column lines of SDRAM 206 according to which bank of SDRAM devices 204 should be activated. In the preferred embodiment, there are four banks in a SDRAM device. One bank is selected during BANK ACTIVATE COMMAND using the SDRAM BAJ0 and BAJ1 signals 302(1) and 302(2) respectively. SDRAM BAJ0 signal 302(1) is a pulse generated from EDO ADDR signal 812 which is OR'ed with a clocked version of itself through latch 814. Latch 814 is clocked by EDO RAS signal 108. Latch 814 is cleared by the output of NAND gate 816, which has PRECHARGE STATE signal 310L and SD CLK signal 228.

SDRAM BAJ1 signal 302(2) is a pulse generated from EDO RAS signal 108 delayed through delay elements 818 and OR'ed with an undelayed version of itself.

Figure 9:
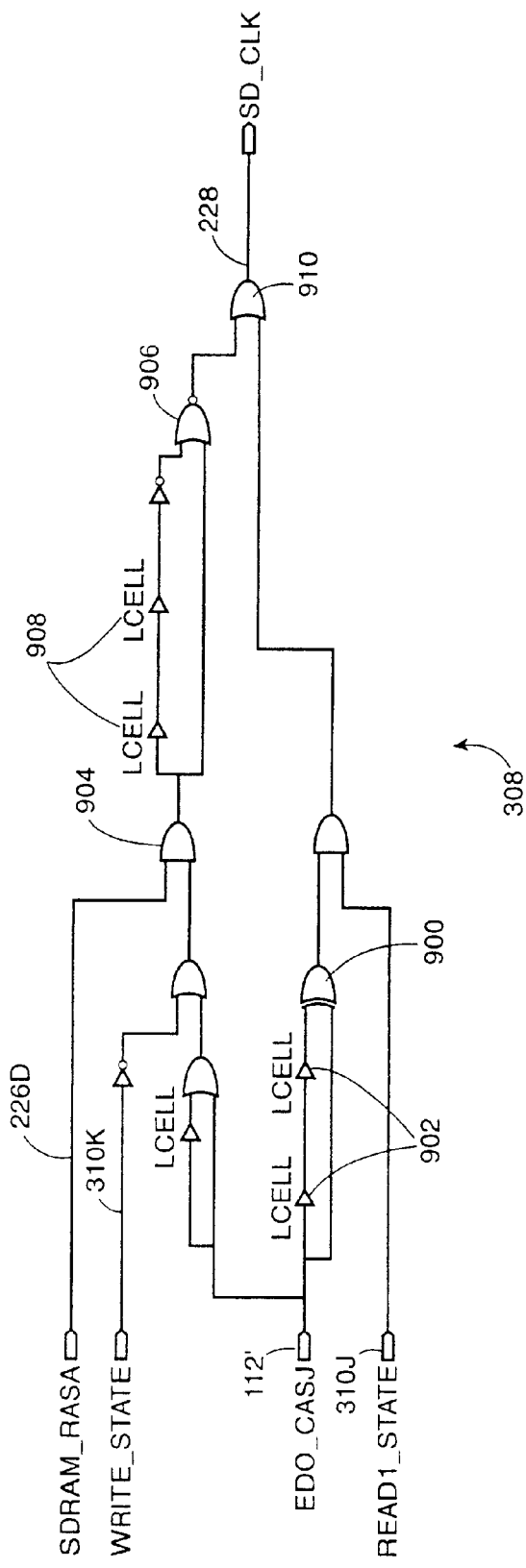
FIG. 9 is a block diagram of input and output signals and logic and control elements of a clock pulse generator of FIG. 4.

Referring to FIG. 9, aspects of SD CLK signal 228 are shown. SD CLK signal 228 generation is an essential aspect of the embodiment. SD CLK signal 228 is used to synchronise and clock operating aspects of SDRAM 206. It has been determined in developing the embodiment that the synchronous operation of SDRAM is not necessarily controlled by a phase lock loop (PLL). Accordingly, a free running clock is not required to synchronise SDRAM, allowing SDRAM to be clocked by an asynchronous train of clock pulses. Accordingly, for the embodiment, a clock pulse is generated asynchronously depending on the operation signals sent by microprocessor 100.

SD CLK pulse 228 is generated in two cases. In the first case, a pulse is generated upon any triggering of an SD RAS signal 226D when WRITE STATE signal 310K is asserted. SDRAM RASA signal 226D must be asserted to a high logical value and either an inverted value of WRITE STATE signal 310K or EDO CASJ signal 112' must also be asserted to a high logical value. Thereafter, a high logical value, produced from AND gate 904, is fed to NOR gate 906 in both an unmodified form and a delayed and inverted form. The delay is provided by two LCELLS 908. Each LCELL 908 has a signal propagation delay of 2.6 to 2.8 ns. The output of XOR gate 900 has a pulse width equivalent to the delay of the two LCELLS, which generates a pulse compatible with SDRAM timing requirements. The pulse width of the pulse generated in the second condition depends on the propagation delay values of LCELLS 908.

For the second case, EDO CAS signal 112 is provided to XOR gate 900 as a direct signal and as a signal delayed through delay elements 902. Accordingly, a rising edge of EDO CAS signal 112 will generate a pulse having a width of the propagation delay in delay elements 902. The pulse is AND'ed with READ1 STATE signal 310J as it is only during a read operation that the converter 220 must force SDRAM 206 to drive the read data on the bus 118a/b.

The signals generated from the first case and the second case are provided to OR gate 910, which combines the two pulses into one SD CLK signal 228.

The preferred embodiment generates clock pulses on edge transitions of EDO control signals like EDO RAS signal 108 and EDO CAS signal 112. Advantages of edge triggering include:

1. The latency from the EDO edge transitions to SDRAM clock pulses is predictable and independent of the host system clock frequency;
2. No clock source is required;
3. By limiting clock pulses to SDRAM devices, data can be held on the bus for extended periods. This allows data, which would normally be valid for only a single clock pulse in a synchronously clocked SDRAM system, to be actively held until a next clock pulse is asynchronously generated. This feature also alleviates synchronization issues with a host microprocessor 100 which may normally require utilizing a known method of data latching to maintain valid data in the RAM for the system;

4. Implementation of translation logic does not require a free running clock, and may be implemented in a single programmable logic device (PLD); and 5. SDRAM clocking requirements do not require tight tolerances on their duty cycles, allowing the clock pulses to be generated by the PLD.

It can be appreciated that other methods known in the art may be used to produce a deterministic delay for a clock pulse. Accordingly, for example, if the PLD has a 2 ns process timing variation, a double pulse would suffer a 4 ns variation. To minimise this error accumulation, the invention provides that the pulse circuit utilises the falling and rising edges of the EDO CAS signal 112 to generate each pulse.

In the present embodiment, the processing of signals by the signal converter arrangement 220 and the timing characteristics of the asynchronous pulse width dictates that read data is provided to the bus approximately 1 Ons later than a comparable EDO card 104. It is necessary for the memory controller or microprocessor 100 to be able to accommodate for the latency.

Additionally, Read/Modify/Write cycles are not supported in the embodiment as provided as data remained driven from SDRAM 206 until after subsequent READ commands occur, thereby causing data contention. This contention may be eliminated with the insertion of an additional clock pulse signal on the READ command. Such insertion of an additional clock pulse signal may be implemented using techniques known in the art.

Figure 10:
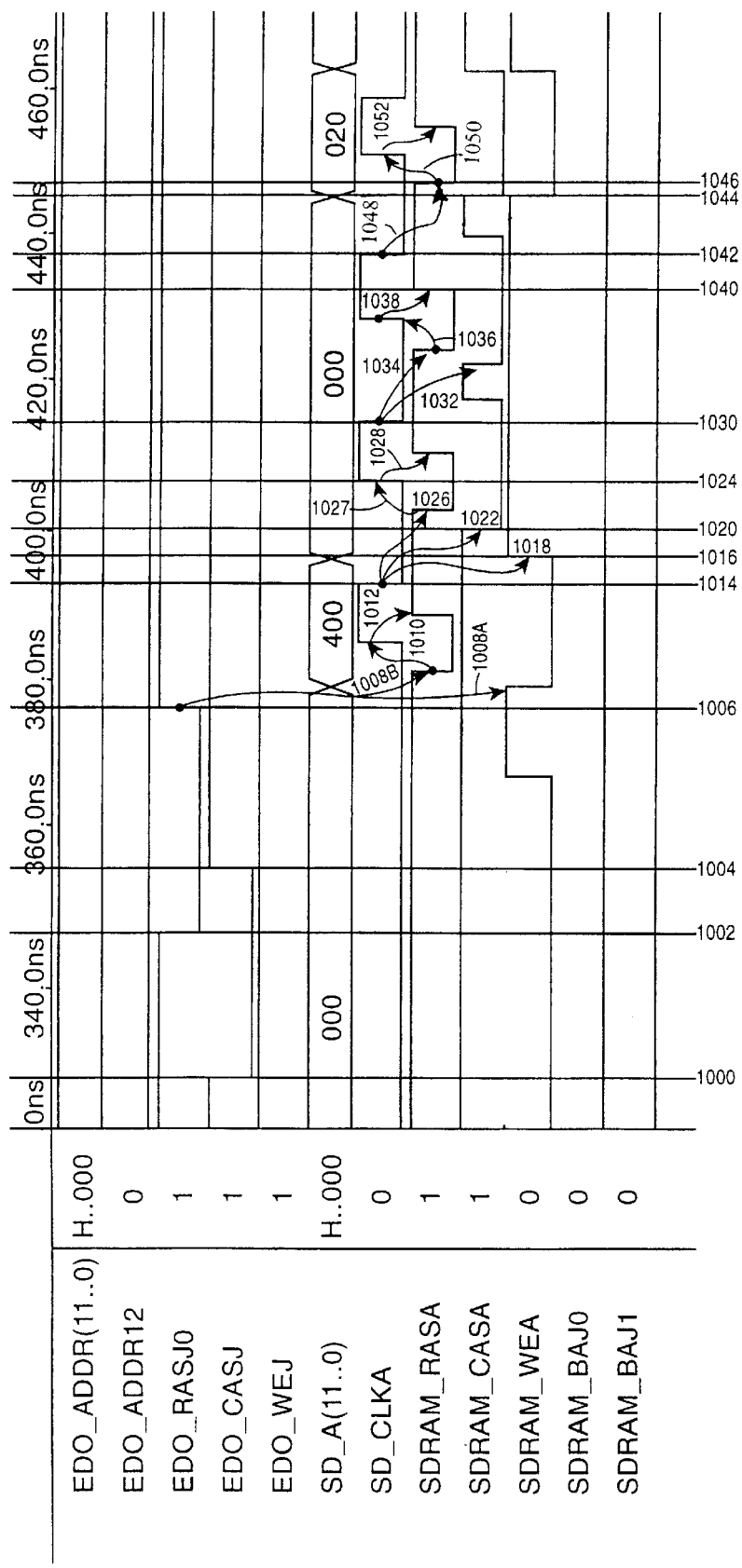
FIG. 10 is a timing diagram of input EDO control signals and corresponding output SDRAM control signals generated in an initialisation operation, processed by the signal conversion arrangement of FIG. 4.

Referring to FIG. 10, unlike EDO RAM 106, SDRAM 206 requires initialisation on power-up by programming its Mode Register (MR). In the embodiment, a simplified LMR sequence is used. Programming the MR comprises issuing to SDRAM 206 a precharge command, then two refresh cycle commands, then a LMR command. The contents of the LMR command program the following aspects of the SDRAM 206: burst length (set to 1 in the preferred embodiment), CAS latency (set to 2), operating mode (set to standard) and write burst mode (set to 0). Accordingly, the value stored in LMR register 318 to program the values of each parameter is 0x020 (hexadecimal).

As described earlier the first set of initialisation signals are the LMR precharge signals, relating to LMR PRE-CHARGE state 604 (FIG. 6). At time 1006 the rising edge of EDO RAS signal 108 causes state machine 300 to generate SDRAM RASA signal 226D and SDRAM WEA signals 226B as shown by arrows 1008A and 1008B.

As described earlier the first set of initialisation signals are the LMR precharge signals, relating to LMR PRE-CHARGE state 604 (FIG. 6). At time 1006 the rising edge of EDO RAS signal 108 causes state machine 300 to generate SD RASA signal 226D and SD WEA signals 226B as shown by arrows 1008A and 1008B.

The falling edge of SDRAM RASA signal 226D causes SD CLKA pulse 228 to be generated as indicated by arrow 1010. Subsequently, the rising edge of SD CLKA signal 228 causes the termination of pulse SDRAM RASA signal 226D as indicated by arrow 1012.

SD CLKA signal 228 is a pulse. Accordingly, at time 1014, SD CLK signal 228 falls causing SDRAM WEA signal 226B to rise at time 1016 (per arrow 1018) which indicates the end of the precharge cycle. Accordingly, SDRAM 206 precharges itself for the remainder of the initialisation sequence.

Next, for the initialisation of SDRAM 206, two refresh cycles are executed. For each refresh cycle, SDRAM CAS signal 226C is held low and SDRAM RAS signal 226D is pulsed low. The falling edge of SDRAM RAS signal 226B trails the falling edge of SDRAM CAS signal 226D and triggers another SD CLKA pulse 228, as shown by arrow 1027. For the embodiment, the asynchronous nature of pulses of SD CLKA pulse 228.

The first refresch cycle lasts between times 1016 to 1030. The deassertion of SD CLKA signal 228 also causes SDRAM CASA signal 226C to fall at time 1020 (per arrow 1022) and SDRAM RASA signal 226D to fall again as indicated by arrow 1026.

The second refresh cycle lasts between times 1030 to 1042. The second refresh cycle is initiated by the falling edge of SD CLKA signal 228 at time 1030. The falling edge of SD CLKA signal 228 causes first SDRAM CASA signal 228C to fall as noted by arrow 1032 and SDRAM RAS signal 226D to fall shortly after as noted by arrow 1034. The rising SDCLK signal 228 is delayed and resets SDRAM CAS signal 228C. As with the first refresh cycle, the falling edge SDRAM CASA signal 226D initializes another SD CLKA pulse 228 as noted by arrow 1036. The next rising edge of SD CLKA signal 228 causes the termination of the SDRAM RAS signal 226D as indicated by arrow 1038.

The falling edge of SD CLKA signal 228 at time 1042 indicates the transition of the state machine 300 to the LMR COMMAND state 610 (FIG. 6). This transition causes SDRAM CAS signal 226C and SDRAM WE signal 226B to fall at about time 1044. Later at time 1046, the falling edge of SD CLKA signal 228 causes SDRAM RAS signal 226D to fall, as indicated by arrow 1048. At this time, the command values held in LMR registers 318 (FIG. 3), namely 0x20 (hexadecimal), are provided to SDRAM devices 206 through the address/bank activate generator 314 (FIG. 3). As described earlier, the LMR command values contain data to program SDRAM 206 for burst mode, CAS latency and the write burst mode for SDRAM 206.

The falling edge of SDRAM RAS signal 226D causes the asynchronous activation of another SD CLKA pulse 228 as shown by arrow 1050. In turn, the rising edge of the SD CLKA signal 228 causes SDRAM RAS signal 226D to rise per arrow 1052. At this time, LMR programming is complete and state machine 300 moves to the IDLE state 612 (FIG. 6).

Next, further timing details are provided relating to signal requirements for a write operation. Referring to Table 2, details are provided of SDRAM 206 control signals generated by signal converter 220 when an EDO RAM 106 write operation is initiated by microprocessor 100. Essentially, in an EDO write cycle, first RAS is asserted, then CAS is asserted. At this time, data is written to the selected cell. To complete the cycle, CAS is deasserted, then RAS is deasserted, signifying the completion of an EDO write cycle. To generate a comparable SDRAM series of commands, signal converter 220 generates an activate command upon receiving a RAS assert then a write command upon receiving a CAS assert. At that time, data is written to the selected cell. As for SDRAM there is no signal corresponding to a CAS deassert in EDO RAM, signal converter 220 essentially ignores this signal and generates no clock signal. Finally, upon receiving a RAS deassert signal, a PRECHARGE signal is issued by signal converter 220.

TABLE 2

EDO RAM Write Commands vs. SDRAM Write commands

| EDO Operation | SDRAM 206 Command |
| --- | --- |
| RAS Assert | Activate |
| CAS Assert | Write (data available) |

TABLE 2-continued

EDO RAM Write Commands vs. SDRAM Write commands

| EDO Operation | SDRAM 206 Command |
|---|---|
| CAS Deassert | No Clock (no action) |
| RAS Deassert | Precharge |

Figure 11:
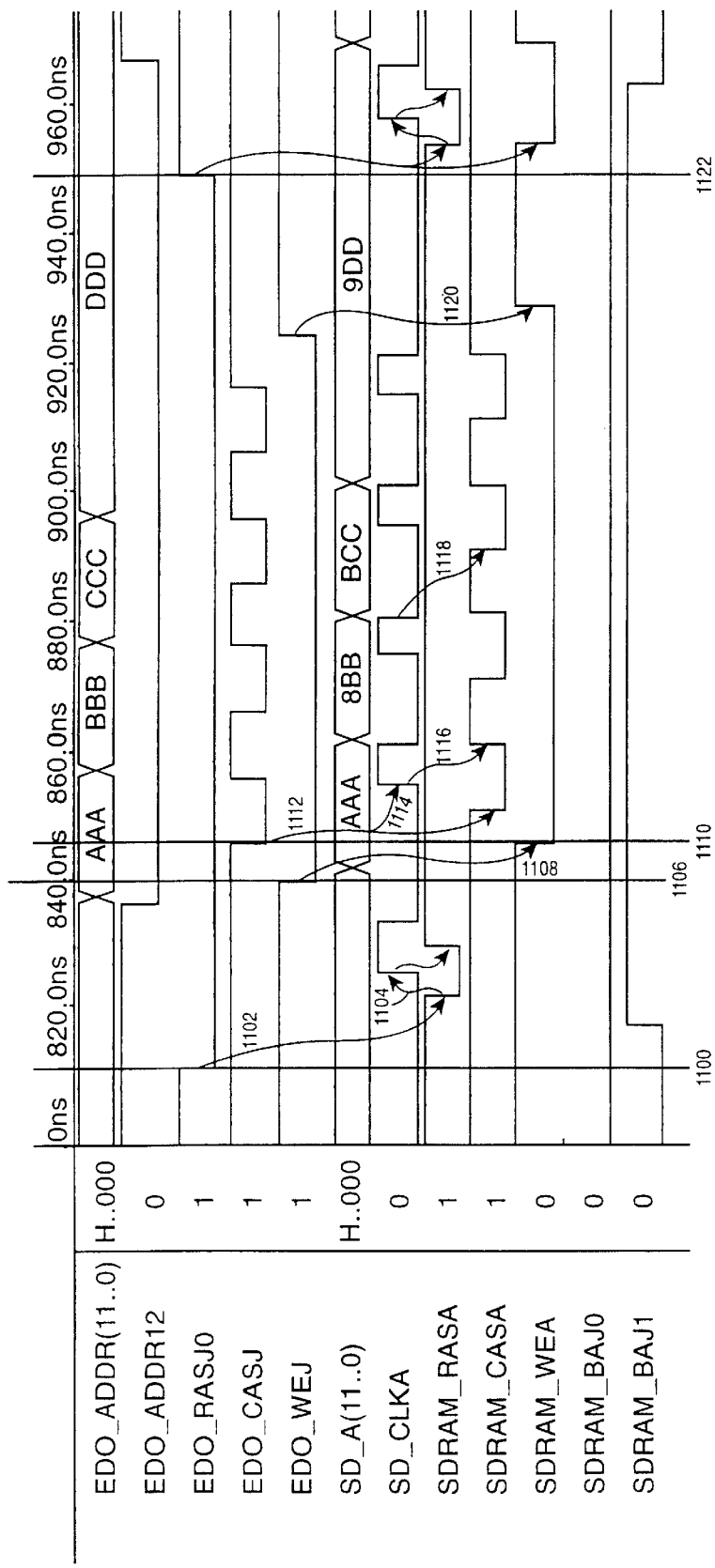
FIG. 11 is a timing diagram of input EDO control signals and corresponding output SDRAM control signals generated write operation, processed by the signal conversion arrangement of FIG. 4.

In FIG. 11, a set of SDRAM 206 write operation signals generated by signal converter 220 from write signals received from microprocessor 100 is shown. Signal converter 220 generates corresponding SDRAM 206 control signals in response to EDO write burst signals received from microprocessor 100. At time 1100 EDO CASJ signal 112' is high and EDO RAS signal 108 has fallen to a low value indicating that a write operation is about to begin.

Next, the falling edge of EDO RASJ signal 108' causes a complementary falling of the SDRAM RAS signal 226D as shown by arrow 1102. The falling edge of SDRAM RAS signal 226D causes the activation of SD CLKA pulse 228 as indicated by arrow 1104. SD CLKA pulse 228 causes the SDRAM 206 to activate a specified row within a specified bank.

Later, at time 1106, microprocessor 100 causes EDO WEJ signal 113' to fall to a logical low value, indicating that a write command is active for EDO memory 106. The falling edge of EDO WEJ signal 113' causes signal converter arrangement 220 to generate corresponding SDRAM WEA signal 226B as indicated by arrow 1108. When microprocessor 100 forces EDO CASJ signal 112' low at time 1110, signal converter arrangement 220 causes a complementary low signal on SDRAM CASA as noted by arrow 1112. At this time, data present is provided to the bus 102 through data lines 118A and 118B (FIG. 4). Also, at this time the specific column is specified on address line 414 and data is provided on data lines 118A and 118B. The falling edge of EDO CASJ signal 112' also causes the initiation of another SD CLKA pulse 228 as indicated by arrow 1114.

Next, the rising edge of SD CLK pulse 228 also triggers the termination of the SDRAM CAS signal 226C as indicated by arrow 1116. It can be appreciated that the initiation of a second clock pulse as shown by arrow 1118 with SDRAM WEA signal 226B still low causes another write operation to SDRAM 206 to occur.

When all write operations have completed, microprocessor 100 deactivates EDO WEJ signal 113'. Accordingly, signal converter arrangement 220 receives the EDO WEJ signal 113' and generates the equivalent to SDRAM WEA signal 226B as shown by arrow 1120.

Later, at time 1122 when EDO'RASJ0 signal 108 is asserted, a precharge set of signal operations is issued to SDRAM 206 in a similar manner to the precharge cycle for the LMR initialisation routine (FIG. 9).

Next, further timing details are provided relating to signal requirements for a read operation. Referring to Table 3, details are provided of SDRAM 206 control signals generated by signal converter 220 when an EDO RAM 106 read operation is initiated by microprocessor 100. In an EDO read cycle, first RAS is asserted, then CAS is asserted. At this time, data is read from the selected cell. To complete the cycle, CAS is deasserted, then RAS is deasserted, signifying the completion of an EDO read cycle. To generate a comparable SDRAM series of commands, signal converter 220 generates an activate command upon receiving a RAS assert then a read command upon receiving a CAS assert. When a CAS deassert signal is generated, an additional SD CLK pulse 228 is generated to drive SDRAM data on the data bus. Finally, upon receiving a RAS deassert signal, a PRECHARGE signal is issued by signal converter 220.

TABLE 3

EDO RAM Read Commands vs. SDRAM Read commands

| EDO Operation | SDRAM 206 Command |
|---|---|
| RAS Assert | Activate |
| CAS Assert | Read |
| CAS Deassert | NOP (Data driven on data bus) |
| RAS Deassert | Precharge |

Most EDO edge transitions require only a single clock pulse to synchronise the equivalent SDRAM command. Read commands, however, require two clock pulses to drive the data onto the respective bus. After the first clock pulse the read command is processed SDRAM 206. After the second clock pulse SDRAM 206 provides the data for the selected row and column strobes for reading.

Figure 12:
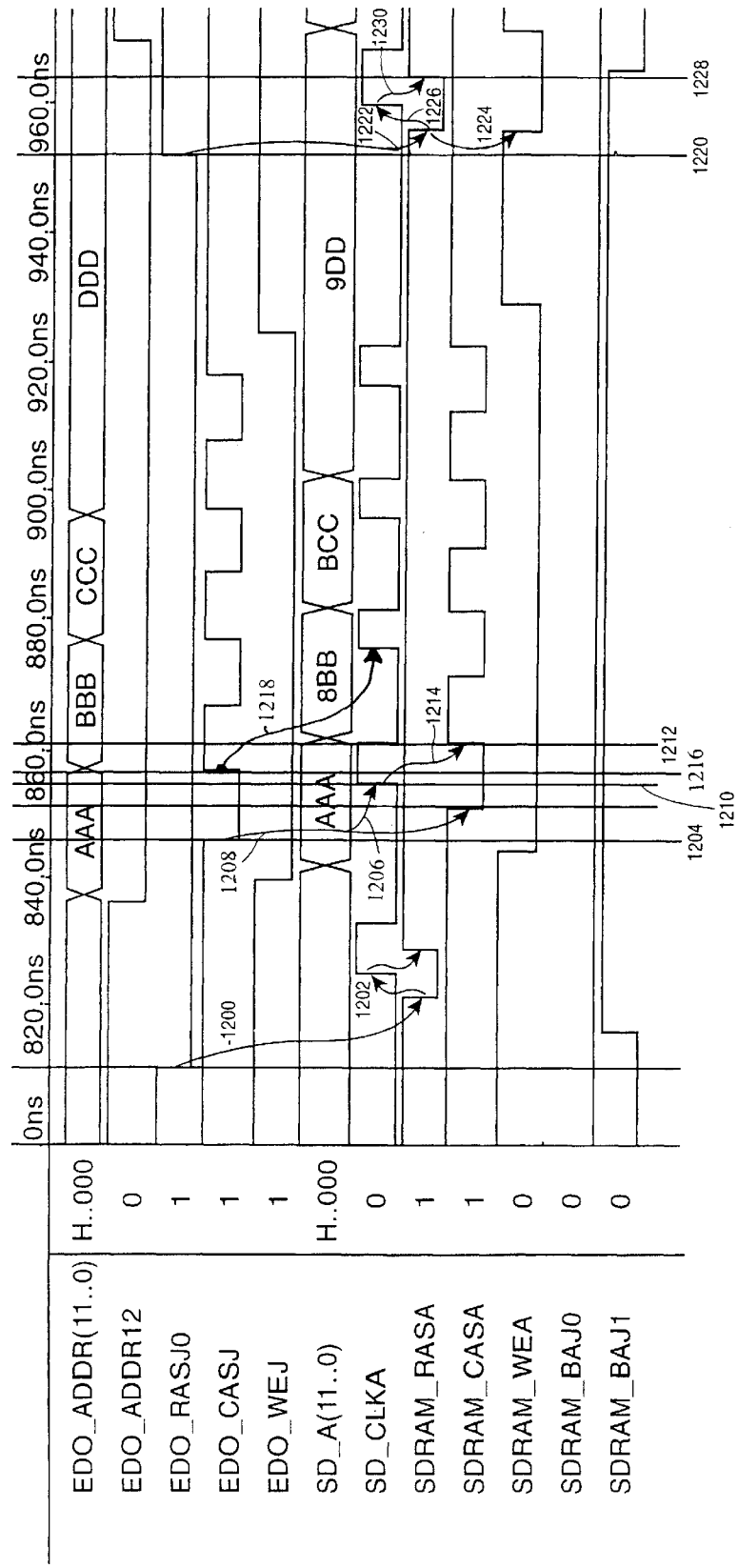
FIG. 12 is a timing diagram of input EDO control signals and corresponding output SDRAM control signals generated read operation, processed by the signal conversion arrangement of FIG. 4.

Referring to FIG. 12, in a read operation, SDRAM 206 must be activated by a sequence of command signals when EDO RASJ0 signal 108 is forced low by microprocessor 100. This causes signal converter arrangement 220 to force SDRAM RAS signal 226D to go to a logical low value as indicated by arrow 1200, thereby triggering a SD CLKA pulse 228, as indicated by arrow 1202, and initiating the activation.

Later, microprocessor 100 forces EDO CASJ signal 112' low at time 1204. At that time, the falling edge of EDO CASJ signal 112' causes signal converter arrangement 220 to generate a SD CLKA pulse 228 as indicated by arrow 1206, thereby forcing SDRAM CASA signal 226C to a logical low as shown by arrow 1208. The rising edge of SD CLKA pulse 228 at 1210 causes SDRAM CAS signal 226C to go to a high value at 1212, as indicated by arrow 1214. This signifies the initiation of the read command.

To complete the read operation, a second SD CLKA signal 228 pulse is required to launch the data. During the first clock pulse, the read command is processed by SDRAM 206. During the second clock pulse, the data is transferred from the contents addressed by the address lines requested to the data line. Accordingly, the rising edge of the EDO CASJ signal 112' at 1216, causes the initialisation of the second clock pulse as shown by arrow 1218. The two clock read operation is also seen in FIG. 6 in READ1 state 620 progressing to READ2 state 622. From this point, burst reads may continue, if required.

When all read operations are completed, the activated row is closed with a precharge air operation by microprocessor 100 issuing the rising edge of EDO RASJ signal 108 at time 1220. This causes signal converter arrangement 220 to force SDRAM RAS signal 226D to a logical low as indicated by arrow 1222 and also ultimately causes SDRAM WEA signal 226B to go to a logical low as indicated by arrow 1224 and SD CLKA pulse 228 to be generated as indicated by arrow 1226. The rising edge of SD CLKA pulse causes SDRAM RAS signal 226D to go high at time 1228 as indicated by arrow 1230.

Referring to Table 4, details are provided of SDRAM 206 control signals generated by signal converter 220 when an EDO RAM 106 data refresh cycle is initiated by microprocessor 100. In an EDO refresh cycle, first RAS is asserted, then CAS is asserted, next, CAS is deasserted, then finally RAS is deasserted. For the comparable SDRAM refresh, no clock or command is generated until the CAS assert signal is received, at which time signal generator 220 generates an auto-refresh signal for the SDRAM.

TABLE 4

EDO RAM Refresh Commands vs. SDRAM Refresh commands

| EDO Operation | SDRAM 206 Command |
|---|---|
| RAS Assert | No Clock or Command |
| CAS Assert | Auto refresh |
| CAS Deassert | No Clock or Command |
| RAS Deassert | No Clock or Command |

Figure 13:
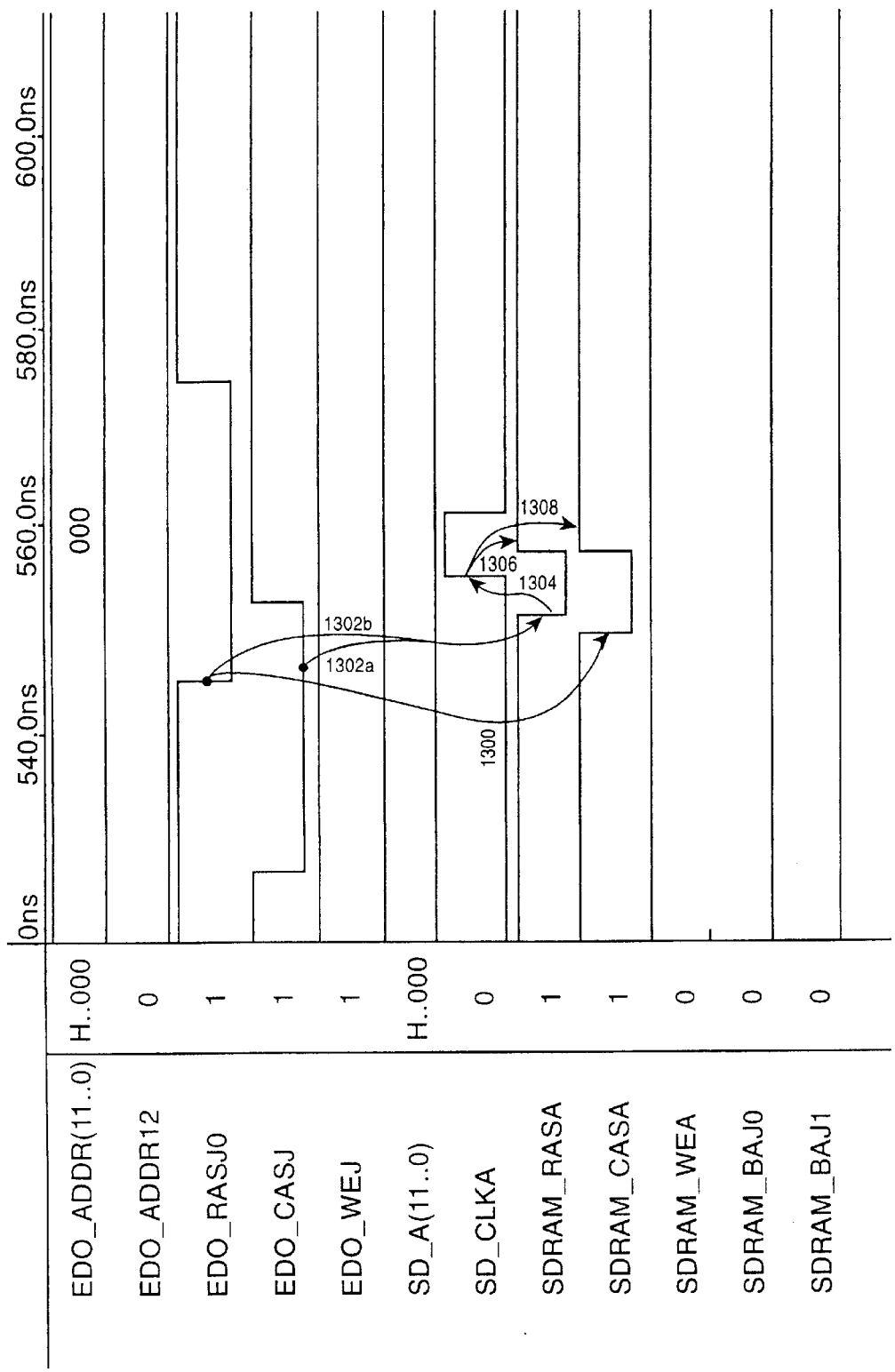
FIG. 13 is a timing diagram of input EDO control signals and corresponding output SDRAM control signals generated in a refresh operation processed by the signal conversion arrangement of FIG. 4.

FIG. 13 illustrates a refresh cycle of signals generated by signal converter arrangement 220 in response to refresh signals generated by microprocessor 100. For EDO memory, a refresh command is provided by microprocessor 100 forcing low EDO CASJ signal 112' and then forcing low EDO RASJ0 signal 108. To generate the equivalent signal for SDRAM 206, signal converter arrangement 220 receives these signals from microprocessor 100, then forces SDRAM CAS signal 226C low (per arrow 1300) and then forces SDRAM RAS signal 226D low (per arrow 1302a and 1302b). The downward transition of the SDRAM RAS signal 226D causes the initiation of SD CLKA pulse 228 (per arrow 1304), which in turn causes the termination of both SDRAM RAS signal 226D (per arrow 1306) and SDRAM CAS signal 226C (per arrow 1308). This is reflected in the transition of signal converter arrangement 220 from IDLE state 614 (FIG. 6) to CBR REFRESH state 616 (FIG. 6) and back to IDLE state 614.

It is noted that those skilled in the art will appreciate that various modifications of detail may be made to the present embodiment, all of which would come within the scope of the invention.

We claim:

1. A method of interfacing an asynchronous memory control system with a synchronous memory device, said method comprising:

receiving a first set of signals indicating an asynchronous memory operation from said control system;

receiving a first memory address associated with said asynchronous memory operation from said control system;

generating a second set of signals, a second memory address and at least one asynchronous clock pulse allowing processing of a comparable synchronous operation to said asynchronous operation by said synchronous memory device at said second memory address, wherein initiation, duration and frequency of said at least one asynchronous clock pulse comply with requirements of said synchronous memory device to process said synchronous operation, said asynchronous operation is a plurality of read operations, said first set of signals comprises asserting an asynchronous row address strobe signal before asserting a plurality of column address strobe signals followed by deasserting said row address strobe signal and said second set of signals comprises asserting a synchronous activate command before asserting a plurality of synchronous read commands, followed by asserting a synchronous precharge command.

2. A method of interfacing an asynchronous memory control system with a synchronous memory device, said method comprising:

receiving a first set of signals indicating an asynchronous memory operation from said control system;

receiving a first memory address associated with said asynchronous memory operation from said control system;

generating a second set of signals, a second memory address and at least one asynchronous clock pulse allowing processing of a comparable synchronous operation to said asynchronous operation by said synchronous memory device at said second memory address, wherein initiation, duration and frequency of said at least one asynchronous clock pulse comply with requirements of said synchronous memory device to process said synchronous operation, said asynchronous operation is a plurality of write operations, said first set of signals comprises asserting an asynchronous row address strobe signal before asserting a plurality of column address strobe signals followed by deasserting said row address strobe signal and said second set of signals comprises asserting a synchronous activate command before asserting a plurality of synchronous write commands, followed by asserting a synchronous precharge command.

3. A method of interfacing an asynchronous memory control system with a synchronous memory device, said method comprising:

receiving a first set of signals indicating an asynchronous memory operation from said control system;

receiving a first memory address associated with said asynchronous memory operation from said control system;

generating a second set of signals, a second memory address and at least one asynchronous clock pulse allowing processing of a comparable synchronous operation to said asynchronous operation by said synchronous memory device at said second memory address, wherein initiation, duration and frequency of said at least one asynchronous clock pulse comply with requirements of said synchronous memory device to process said synchronous operation, said asynchronous operation is a refresh operation, said first set of signals comprises asserting an asynchronous column address strobe signal before asserting a row address strobe signal and said second set of signals comprises asserting a synchronous refresh command.

4. The method as in claims 1, 2 or 3 wherein said at least one asynchronous clock pulse is generated after receiving an edge transition of a signal in said first set of signals.

5. The method as in claims 1, 2, or 3 wherein said at least one asynchronous clock pulse is deasserted after a fixed length of time.

6. The method as in claims 1, 2 or 3 wherein said at least one asynchronous clock pulse is generated after receiving an edge transition of a signal in said first set of signals, and said asynchronous memory control system controls one of EDO RAM and FAST PAGE RAM.

7. The method as in claims 1, 2 or 3 wherein said synchronous memory is selected from a group comprising SDRAM, PC SDRAM, and synchronous RAM.

8. The method as in claims 1, 2 or 3 wherein said method progresses through a plurality of states, wherein each state in said plurality of states controls one aspect of generating said second set of signals.

9. The method as in claims 1, 2 or 3 wherein said method progresses through a plurality of states, wherein each state in said plurality of states controls one aspect of generating said second set of signals, said each state is entered according to status of said first set of signals and said each state is exited with assertion of said at least one asynchronous clock pulse.

10. A signal converter arrangement for interfacing an asynchronous memory control system with a synchronous memory device, said signal converter arrangement comprising:
- a first set of inputs for receiving a first set of signals indicating an asynchronous memory operation from said control system;
- a second set of inputs receiving a first memory address associated with said asynchronous memory operation from said control system;
- a command generator for receiving said first set of signals, generating a second set of signals of comparable synchronous signals from said first set of signals for a comparable synchronous memory operation to said asynchronous memory operation and providing said second set of signals to said synchronous memory device;
- an address generator for generating a second memory address from said first memory address for said synchronous memory operation and providing said second signal set to said synchronous memory device; and
- a clock pulse generator for generating at least one asynchronous clock pulse for said synchronous memory operation and providing said at least one asynchronous clock pulse to said synchronous memory device,
  - wherein said second memory address and said at least one asynchronous clock pulse allow processing of said synchronous operation through said second set of signals by said synchronous memory device at said second memory address,
  - said asynchronous operation is at least one read operation, said first set of signals comprises asserting an asynchronous row address strobe signal before asserting at least one column address strobe signal then deasserting said asynchronous row address signal and said second set of signals comprises asserting a synchronous activate command before asserting at least one synchronous read command then asserting a synchronous refresh command.

11. A signal converter arrangement for interfacing an asynchronous memory control system with a synchronous memory device, said signal converter arrangement comprising:
- a first set of inputs for receiving a first set of signals indicating an asynchronous memory operation from said control system;
- a second set of inputs receiving a first memory address associated with said asynchronous memory operation from said control system;
- a command generator for receiving said first set of signals, generating a second set of signals of comparable synchronous signals from said first set of signals for a comparable synchronous memory operation to said asynchronous memory operation and providing said second set of signals to said synchronous memory device;
- an address generator for generating a second memory address from said first memory address for said synchronous memory operation and providing said second signal set to said synchronous memory device; and
- a clock pulse generator for generating at least one asynchronous clock pulse for said synchronous memory operation and providing said at least one asynchronous clock pulse to said synchronous memory device,
wherein said second memory address and said at least one asynchronous clock pulse allow processing of said synchronous operation through said second set of signals by said synchronous memory device at said second memory address, said asynchronous operation is a write operation, said first set of signals comprises asserting an asynchronous write enable signal, asserting an asynchronous row address strobe signal before asserting at least one column address strobe signal followed by deasserting said row address strobe signal and said second set of signals comprises asserting a synchronous activate command before asserting at least one synchronous write command followed by asserting a synchronous refresh command.

12. A signal converter arrangement for interfacing an asynchronous memory control system with a synchronous memory device, said signal converter arrangement comprising:
- a first set of inputs for receiving a first set of signals indicating an asynchronous memory operation from said control system;
- a second set of inputs receiving a first memory address associated with said asynchronous memory operation from said control system;
- a command generator for receiving said first set of signals, generating a second set of signals of comparable synchronous signals from said first set of signals for a comparable synchronous memory operation to said asynchronous memory operation and providing said second set of signals to said synchronous memory device;
- an address generator for generating a second memory address from said first memory address for said synchronous memory operation and providing said second signal set to said synchronous memory device; and
- a clock pulse generator for generating at least one asynchronous clock pulse for said synchronous memory operation and providing said at least one asynchronous clock pulse to said synchronous memory device,
wherein said second memory address and said at least one asynchronous clock pulse allow processing of said synchronous operation through said second set of signals by said synchronous memory device at said second memory address, said asynchronous operation is a refresh operation, said first set of signals comprises asserting an asynchronous column address strobe signal before asserting a row address strobe signal and said second set of signals comprises asserting a synchronous refresh command.

13. The signal converter arrangement as in claims 10, 11, or 12 wherein said clock pulse generator generates said at least one asynchronous clock pulse after receiving an edge transition of a signal in said first set of signals.

14. The signal converter arrangement as in claims 10, 11, or 12 wherein said clock pulse generator deasserts said at least one asynchronous clock pulse after a fixed length of time.

15. The signal converter arrangement as in claims 10, 11, or 12 wherein said asynchronous memory control system controls one of EDO RAM and FAST PAGE RAM.

16. The signal converter arrangement as in claims 10, 11, or 12 wherein said signal converter arrangement controls one of a group of synchronous memory protocols comprising SDRAM, PC SDRAM and SRAM.

17. The signal converter arrangement as in claims 10, 11, or 12 wherein said command generator comprises a plurality of states, wherein each state in said plurality of states controls one aspect of generating said second set of signals and progression between two of said plurality of states is controlled by said command generator.

18. The signal converter arrangement as in claims 10, 11, or 12 wherein said command generator comprises a plurality of states, wherein each state in said plurality of states controls one aspect of generating said second set of signals and progression between two of said plurality of states is controlled by said command generator, said each state is entered according to status of said first set of signals and said each state is exited with assertion of said at least one asynchronous clock pulse.

19. The signal converter arrangement as in claims 10, 11, or 12 wherein said signal converter arrangement is a programmable logic device.

* * * * *